(12) United States Patent
Maradiaga

(10) Patent No.: US 12,426,651 B2
(45) Date of Patent: Sep. 30, 2025

(54) EYEWEAR FACEMASK

(71) Applicant: Marty Maradiaga, Pasadena, CA (US)

(72) Inventor: Marty Maradiaga, Pasadena, CA (US)

( * ) Notice: Subject to any disclaimer, the term of this patent is extended or adjusted under 35 U.S.C. 154(b) by 0 days.

(21) Appl. No.: 18/630,361

(22) Filed: Apr. 9, 2024

(65) Prior Publication Data

US 2024/0251889 A1     Aug. 1, 2024

Related U.S. Application Data

(62) Division of application No. 17/178,186, filed on Feb. 17, 2021, now abandoned.

(51) Int. Cl.
*A41D 13/11*     (2006.01)

(52) U.S. Cl.
CPC ...... *A41D 13/1161* (2013.01); *A41D 13/1107* (2013.01)

(58) Field of Classification Search
CPC ............ A41D 13/1107; A41D 13/1161; A41D 13/1115; A41D 13/1138; A41D 13/1184; A41D 13/11
See application file for complete search history.

(56) References Cited

U.S. PATENT DOCUMENTS

| | | |
|---|---|---|
| 1,635,328 A | 7/1927 | Edward |
| 2,265,529 A | 12/1941 | Kemp |
| 2,281,744 A * | 5/1942 | Brunner ............. A41D 13/1161 128/206.13 |
| 2,447,450 A | 8/1948 | Williams |
| 3,991,753 A | 11/1976 | Viesca y Viesca |
| 4,796,621 A | 1/1989 | Barle et al. |
| 5,424,787 A | 6/1995 | Zegarelli |
| 5,561,863 A | 10/1996 | Carlson, II |
| 5,704,063 A | 1/1998 | Tilden |
| 6,116,903 A | 9/2000 | Zegarelli et al. |
| 2004/0211426 A1 | 10/2004 | Lai |

(Continued)

FOREIGN PATENT DOCUMENTS

| | | | |
|---|---|---|---|
| DE | 202020101836 U1 | 5/2020 | |
| DE | 202020102794 U1 * | 8/2020 | ......... A41D 13/1161 |

(Continued)

OTHER PUBLICATIONS

Definition of "grummet". Accessed from https://www.vocabulary.com/dictionary/grummet on Nov. 21, 2024. (Year: 2024).*

(Continued)

*Primary Examiner* — Patrick J. Lynch
*Assistant Examiner* — Brianna T. Duckworth
(74) *Attorney, Agent, or Firm* — Fish & Richardson P.C.

(57) ABSTRACT

A face mask system can include eyeglasses and a face mask. The eyeglasses can be worn by a user and can have first and second temples that can extend at least partially behind ears of the user to secure the eyeglasses to a face of the user. The face mask can be removably attached to the eyeglasses when (Continued)

worn by the user. The face mask can have a covering portion sized and shaped to cover at least part of a user's nose and/or mouth, a first connector extending from the covering portion to the first temple of the eyeglasses, and a second connector extending from the covering portion to the second temple of the eyeglasses.

1 Claim, 25 Drawing Sheets

(56) References Cited

U.S. PATENT DOCUMENTS

| | | | |
|---|---|---|---|
| 2007/0252946 | A1 | 11/2007 | Welchel et al. |
| 2016/0151650 | A1 | 6/2016 | Reese |
| 2021/0393996 | A1 | 12/2021 | Bernstein |
| 2021/0401085 | A1* | 12/2021 | Liu .................... A41D 13/1161 |
| 2022/0079267 | A1 | 3/2022 | Mason |
| 2022/0087336 | A1* | 3/2022 | Youkhana .......... A41D 13/1161 |
| 2022/0183407 | A1* | 6/2022 | Zheng ................. A62B 18/084 |
| 2022/0192291 | A1 | 6/2022 | Lawrence |
| 2022/0256950 | A1 | 8/2022 | Maradiaga |

FOREIGN PATENT DOCUMENTS

| | | | |
|---|---|---|---|
| GB | 688976 | 3/1953 | |
| JP | H0511954 | 2/1993 | |
| JP | H09239050 | 9/1997 | |
| WO | WO-2018030869 A2 * | 2/2018 | ............. A41D 13/11 |

OTHER PUBLICATIONS

Machine translation (Korean to English) of WO2018030869. Accessed from WIPO on Nov. 21, 2024. (Year: 2024).*

Machine translation (German to English) of DE 202020102794 U1. Accessed from EPO on Sep. 6, 2023. (Year: 2023).*

Amazon.com [online], "Swiss Eye Neoprene Face Mask with Integrated Goggles Black Clear Lens," May 22, 2013, retrieved on Feb. 16, 2021, retrieved from URL <https://www.amazon.com/Swiss-Eye-Neoprene-Integrated-Goggles/dp/B0095J8F54>, 8 pages.

Amazon.com [online], "Titus MS1 Multi-Purpose Full Face Mask w/Integrated Goggles (Vented) Economy Protection," Oct. 6, 2017, retrieved on Feb. 16, 2021, retrieved from URL <https://www.amazon.com/Titus-Multi-Purpose-Integrated-Goggles-Protection/dp/B0767Q72WD>, 6 pages.

Belle Wholesale.com [online], "Outdoors Anti-fog Protective Mask Bandanas," Oct. 2020, retrieved on Feb. 16, 2021, retrieved from URL <https://www.bellewholesale.com/product/Outdoors-Anti-fog-Protective-Mask-Bandanas/SQ0430-bwls2-bl/53a6ea3b-7512-4f55-8342-5afafe75c761.html>, 3 pages.

Machine translation (German to English) of DE202020101836U1. Accessed from EPO on Sep. 6, 2023. (Year: 2023).

* cited by examiner

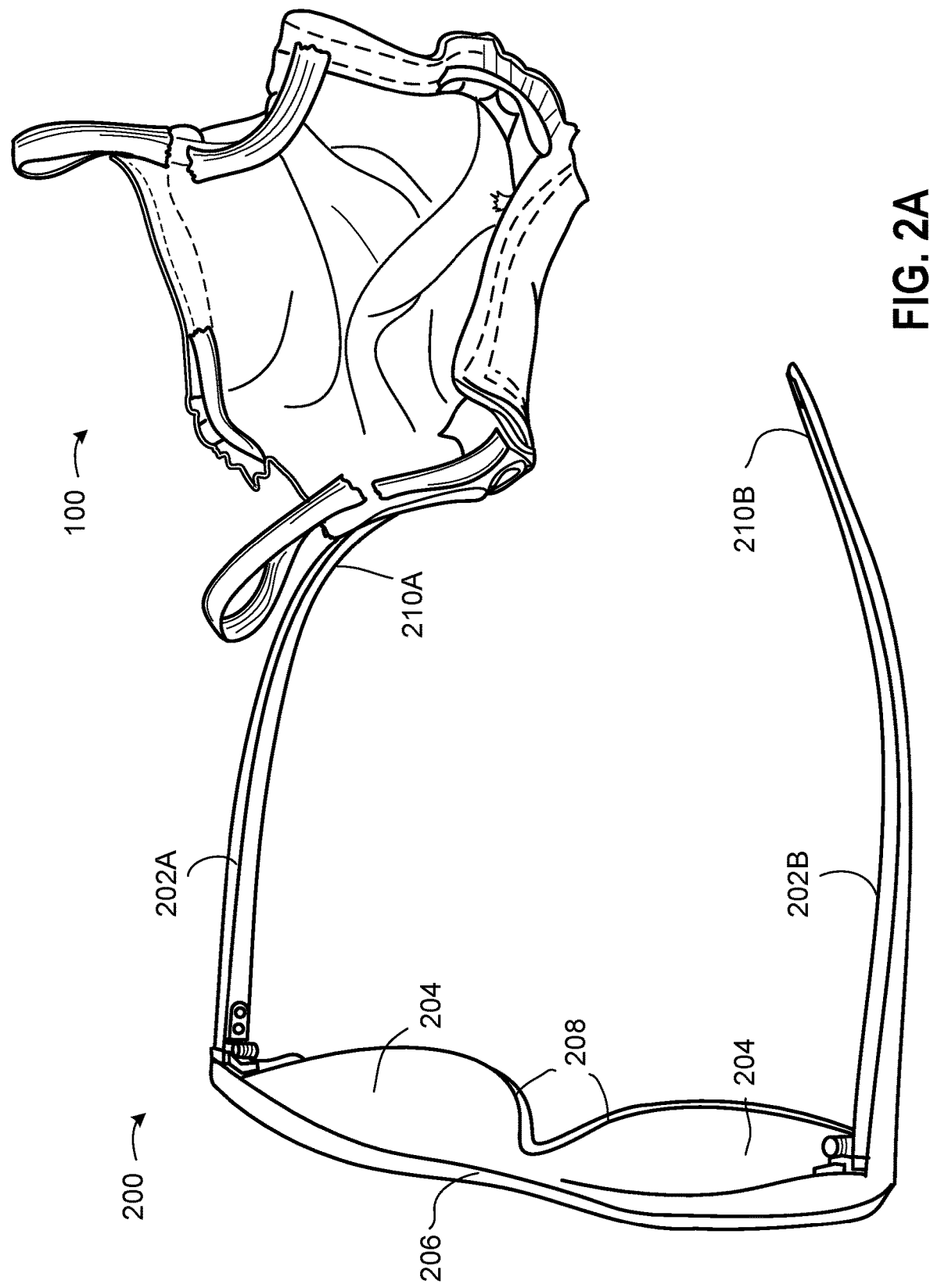

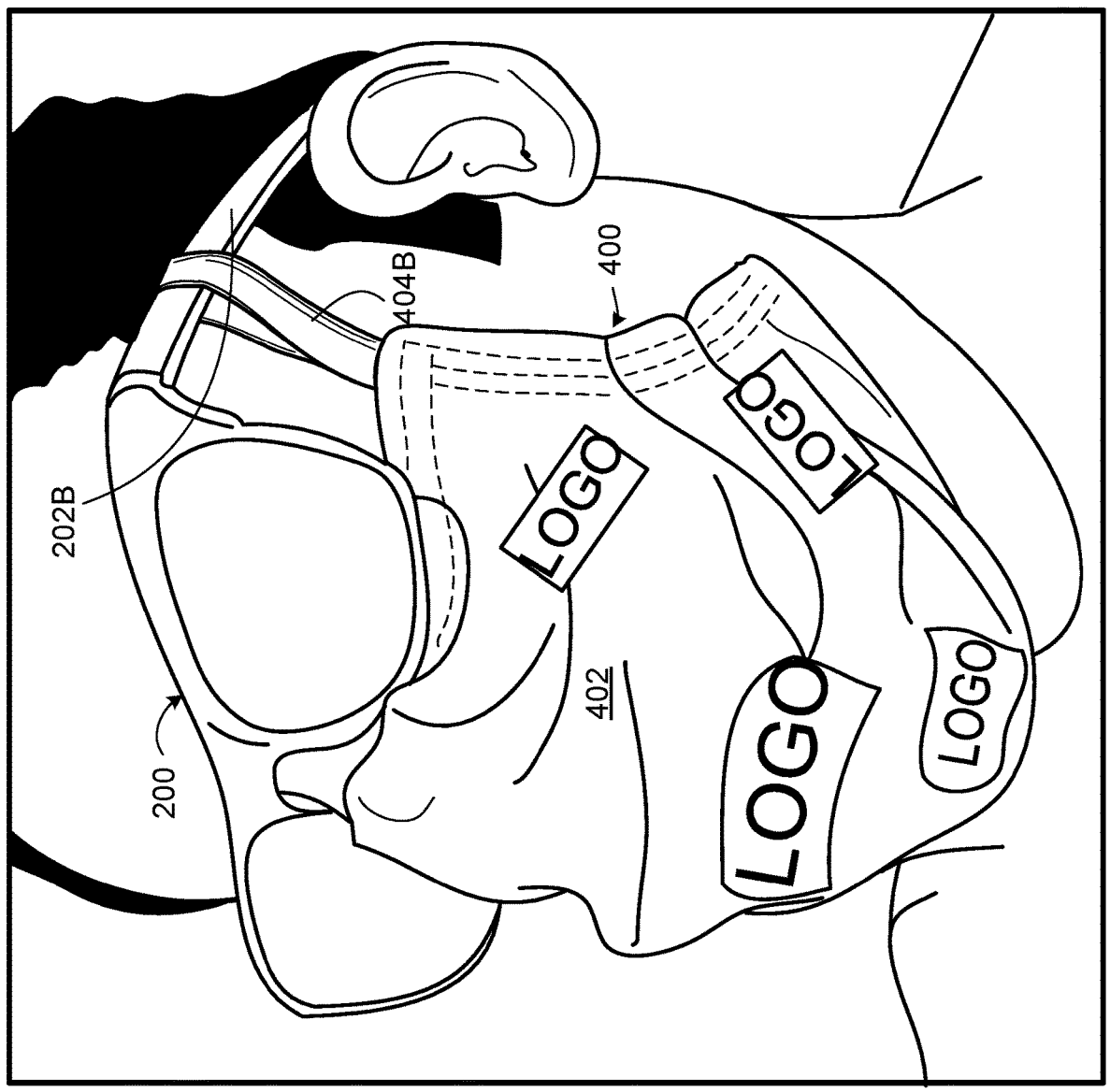

EYEWEAR FACEMASK

CROSS REFERENCE TO RELATED APPLICATION

This application is a divisional of U.S. application Ser. No. 17/178,186, filed on Feb. 17, 2021. The disclosure of the prior application is considered part of and is incorporated by reference in the disclosure of this application.

TECHNICAL FIELD

This document describes devices, systems, and methods related to facemasks. More specifically, this document is related to facemasks to be worn with eyewear.

BACKGROUND

A person may wear a facemask to create a barrier between the person's mouth/nose and bacteria, germs, or other particles that can be circulated in the air. Example facemasks can be made of cotton or other similar materials. Other facemasks can be surgical facemasks, N95, or other regulatory compliant masks. Such facemasks can, for example, connect to a person's ears or wrap around the person's head.

SUMMARY

The document generally relates to eyewear facemasks. A person may desire to wear a facemask to protect themselves from inhaling bacteria, germs, or other particles that can be circulated in the air of a surrounding environment. The person may also desire to wear the facemask to protect others from inhaling particles that are exhaled by the person. The person may also use eyewear to heighten their vision and/or to protect their eyes from particles in the air. However, wearing eyewear, such as glasses, with a facemask can be uncomfortable, especially when the person wears both for extended periods of time with components of both the eyewear and the facemask can loop around/behind the person's ears. Doing so can cause discomfort and/or added weight to the person's ears. The facemask can also shift underneath or over the eyewear, causing discomfort and/or fogging of lens of the eyewear.

The disclosed technology can provide for an eyewear facemask that can be removably attached to eyewear. The eyewear facemask can have two connectors positioned at top corners of the facemask for attaching the facemask to temples of the eyewear. The two connectors attach to temples of the eyewear to distribute weight of the facemask to the eyewear rather than a user's ears. Thus, the eyewear facemask does not loop directly around the user's ears. When the user wears the eyewear facemask with eyewear, only temples of the eyewear loop around the user's ears. This can provide for more comfortable wearing of the facemask and eyewear for longer periods of time.

Moreover, expandable elastic portions can be integrated/sewn along edges of the facemask so that the facemask can cup the user's face (around their nose, mouth, and/or chin). This can provide for more comfortable wearing of the facemask, especially since the facemask may only have two loop connectors positioned at the top corners of the facemask instead of connectors attached along sides of the facemask, as with traditional facemasks. The eyewear facemask can also include a removable strap that can loop through the two connectors and around the back of the user's head. The eyewear facemask can use an additional strap to be converted into a facemask that can be worn without eyewear while still being comfortable for long periods of time.

Particular embodiments described herein include a face mask system including eyeglasses configured to be worn by a user, the eyeglasses having first and second temples that can extend at least partially behind ears of the user to secure the eyeglasses to a face of the user, and a face mask removably attached to the eyeglasses when worn by the user. The face mask can include a covering portion sized and shaped to cover at least part of a user's nose and/or mouth, a first connector extending from the covering portion to the first temple of the eyeglasses, and a second connector extending from the covering portion to the second temple of the eyeglasses.

In some implementations, the disclosed embodiments can optionally include one or more of the following features. For example, the disclosed embodiments can include a first elastic attachment (e.g., elastic tensioner) positioned laterally along a top edge of an interior side of the covering portion, a second elastic attachment positioned laterally along a bottom edge of the interior side of the covering portion, a third elastic attachment positioned vertically along a first side edge of the interior side of the covering portion, and a fourth elastic attachment positioned vertically along a second side edge of the interior side of the covering portion. The first, second, third, and fourth elastic attachments can combine with the covering portion to form a cup shape, wherein the cup shape of the covering portion encloses at least part of the user's nose, mouth, and/or chin.

Disclosed embodiments can also include a removable strap that can be removably attach to the first and second connectors of the face mask when the user is not wearing the eyeglasses with the facemask. The removable strap can include a first end portion and a second end portion. The first end portion can loop around the first connector and the second end portion can loop around the second connector. The first and second end portions can retain the removable strap to the first and second connectors using at least one of hook and loop fasteners, buckles, snaps, or buttons. The removable strap can extend around a back portion of a head of the user. The removable strap can also include a tightening mechanism to adjust the removable strap around the back portion of the head of the user.

As other examples, the covering portion can include a textile filter. The first and second connectors each can include an elastic material. The first, second, third, and fourth elastic attachments can be sewn loosely to expandable sections of the covering portion of the face mask, wherein the expandable sections of the covering portion can be pleated. The first and second connectors can be loops, hooks, or non-loop connectors. The first connector can be attached to the covering portion at a first top corner of the covering portion and the second connector can be attached to the covering portion at a second top corner of the covering portion opposite the first top corner. The first connector can be used for attachment to the first temple of the eyeglasses and the second connector can be used for attachment to the second temple of the eyeglasses.

Particular embodiments described herein can also include a face mask including a covering portion sized and shaped to cover at least part of a user's nose and/or mouth, a first loop attached to the covering portion at a first top corner of the covering portion, and a second loop attached to the covering portion at a second top corner of the covering portion opposite the first top corner. The first and second loops can include hooks.

Particular embodiments described herein can also include a face mask that can be removably attached to eyeglasses, the face mask including a covering portion sized and shaped to cover at least part of a user's nose and/or mouth, a first eyeglasses connector positioned at a first top corner of the covering portion, a second eyeglasses connector positioned at a second top corner of the covering portion opposite the first top corner, wherein the first eyeglasses connector can attach to a first temple of the eyeglasses and the second eyeglasses connector can attach to a second temple of the eyeglasses when worn by a user, a first elastic tensioner positioned laterally along a top edge of an interior side of the covering portion, a second elastic tensioner positioned laterally along a bottom edge of the interior side of the covering portion, a third elastic tensioner positioned vertically along a first side edge of the interior side of the covering portion, and a fourth elastic tensioner positioned vertically along a second side edge of the interior side of the covering portion.

The disclosed technology may provide one or more of the following advantages. For example, the disclosed eyewear facemask can be more comfortable to wear. The loop connectors of the facemask can be positioned at top corners of the facemask to more evenly distribute weight of the facemask. Therefore, the loop connectors can attach around temples of the eyewear rather than the person's ears. Therefore, the user may not be uncomfortable having weight from both ear loops of a traditional facemask and temples of the eyewear on their ears. Moreover, since discomfort is reduced and weight is more evenly distributed, the person can wear the eyewear facemask for longer periods of time.

Some embodiments of the disclosed facemask can have elastic attachments around sides of the facemask to cup the mask to the person's face. The cup shape can make it easier for the person to breathe and/or speak while wearing the facemask, especially for extended periods of time. The elastic attachments can also expand the facemask to cup any size of the person's face without tightening a fabric or other material of the facemask over the person's nose/mouth. Expansion of the facemask can make it more comfortable and less rigid to wear. Expansion of the facemask can also make it adaptable for different people, based on the shape and/or size of their face. Therefore, the facemask can be made as one-size-fits-all or one-size-fits-most.

The cup shape of the disclosed facemask can also be aesthetically appealing. The facemask attaches to temples of eyewear by two connectors positioned at top corners of the facemask. The disclosed facemask can have fewer connectors or less visible connectors as compared to some facemasks, and therefore, when the disclosed facemask is worn by a user, it can look as if the facemask is merely covering the user's face without actually looping behind the user's ears. This aesthetic appeal can be achieved since the elastic attachments can compress edges of the facemask to the user's face and the two connectors can loop around the temples of eyewear. The disclosed facemask can look as if it is attached directly to the person's face rather than being secured over the person's face with visible ear loops. Fewer visible components of the disclosed facemask can provide for a cleaner, more aesthetically pleasing look.

As another example, removable integration of the facemask with eyewear can provide for a uniform/unitary look/appearance as compared to masks that do not provide for direct attachment to eyewear and that can appear separate, disjointed, and/or less aesthetically pleasing. With the disclosed facemask, the eyewear and facemask can appear to be one product rather than two separate and distinct products worn at the same time. This can provide for a more aesthetically appealing look.

As another example, the disclosed eyewear facemask can be convertible such that it can be worn without eyewear. As a result, the disclosed facemask can be versatile based on different scenarios and/or user preferences. The facemask can include a removable strap that can attach to the loop connectors. The user can choose to wear the disclosed facemask with different eyewear as well as without any eyewear. For example, if the user is wearing sunglasses and then it becomes overcast, the user can take off the sunglasses but still protect themselves from outside particles by wearing the disclosed facemask with the removable strap. The user can easily slide the facemask's loop connectors off the temples of the sunglasses and snap/attach the removable strap around each of the loop connectors before putting the facemask back on.

The removable strap can wrap around a back of the user's head to reduce stress, strain, or discomfort that can result from looping a facemask around the user's ears. Weight of the facemask can be distributed around and to the back of the user's head rather than on the user's ears. Therefore, the user can wear the disclosed facemask for extended periods of time with less discomfort.

The removable strap can also be made from an elastic material and adjustable to fit around any size head. The user can make the strap tighter or looser around their head based on their preference. This can also reduce stress behind the ears and more evenly distribute weight of the facemask. The removable strap, like the disclosed facemask, can be made in one-size-fits-all or one-size-fits-most, which can reduce production costs. In other implementations, it can be advantageous to produce the removable strap and/or the disclosed facemask in different sizes (e.g., small, medium, and large) to cater to different groupings of user face sizes.

As yet another example, some embodiments of the disclosed facemask can be made from a material that is machine-washable. The facemask can be cleaned and re-used without compromising integrity of the facemask or frustrating its purpose to protect the person from particles in a surrounding environment. Washing the facemask also may not compromise the elastic attachments sewn into edges or sides of the facemask. Therefore, the facemask can continue to hold the cup shape around the user's nose, mouth, and/or chin.

Moreover, the disclosed facemask can reduce fogging of lens of the eyewear. An elastic attachment along a top edge of the facemask can secure the facemask to the bridge of the user's nose. Therefore, when the user breathes, air may not escape under and out from the top edge of the facemask to fog lens of the eyewear. Moreover, this elastic attachment can cause the facemask to remain under/beneath the eyewear so that the eyewear does not move beneath fabric of the facemask. When the eyewear is under the facemask, the lens may be more prone to fogging. Overall fogging of the lens can also be reduced since elastic attachments around all sides/edges of the facemask cup the facemask to the user's cheeks and chin. This cupping shape can reduce a possibility that the person's breath filters out through sides of the facemask and fogs the lens of the eyewear.

As yet another example, the disclosed facemask can be less costly to manufacture. The facemask can be manufactured as one-size-fits-all or one-size-fits-most. The loop connectors can be large enough and/or expandable (e.g., made from an elastic material) to fit around many size temples of eyewear. Therefore, the facemask can be worn with many types of eyewear. The elastic attachments can also be loosely sewn/integrated into the sides of the facemask such that there is play in a material of the facemask to expand around any size of the person's face. Even with embodiments of the facemask that are manufactured based on size, the facemask can be manufactured at a lower cost by manufacturing in customary sizes such as small, medium, and large.

The details of one or more implementations are set forth in the accompanying drawings and the description below. Other features and advantages will be apparent from the description and drawings, and from the claims.

BRIEF DESCRIPTION OF THE DRAWINGS

FIG. 2A depicts the eyewear facemask and eyewear.

FIG. 4A depicts a side view of another example eyewear facemask attached to eyewear.

Like reference symbols in the various drawings indicate like elements.

DETAILED DESCRIPTION OF ILLUSTRATIVE EMBODIMENTS

This document generally relates to eyewear facemasks that can be removably attached to different types of eyewear (e.g., glasses). In particular, the disclosed facemask can be worn with glasses or other eye protection for extended periods of time without causing discomfort to the user. For example, the disclosed facemask can attach to temples of the eyewear so that weight of the facemask can be distributed to the eyewear rather than directly to the user's ears. Since loop connectors of the facemask can attach to the user's eyewear, the loop connectors may not loop around the user's ears, thereby resulting in less tension, discomfort, and/or weight on the user's ears. The facemask can also be worn with a removable strap that wraps around the head of the user instead of attaching the facemask to the eyewear. Therefore, the disclosed facemask can be versatile and used in different settings or based on user preference. The disclosed facemask can be made of a cotton material or similar textile for protecting the user from particles in the surrounding air/environment. The disclosed facemask can also be machine-washable and reusable. The disclosed facemask can also have a filtering textile integrated therein. Moreover, the facemask can include elastic attachments configured to cause the facemask to expand around the user's nose, mouth, and/or chin. The facemask can therefore create a cup shape that provides more comfort to the user when worn for extended periods of time. The cup shape can also be advantageous to secure the mask against the user's face without having to extend loop connectors along sides of the facemask and around the user's ears.

Figure 1A:
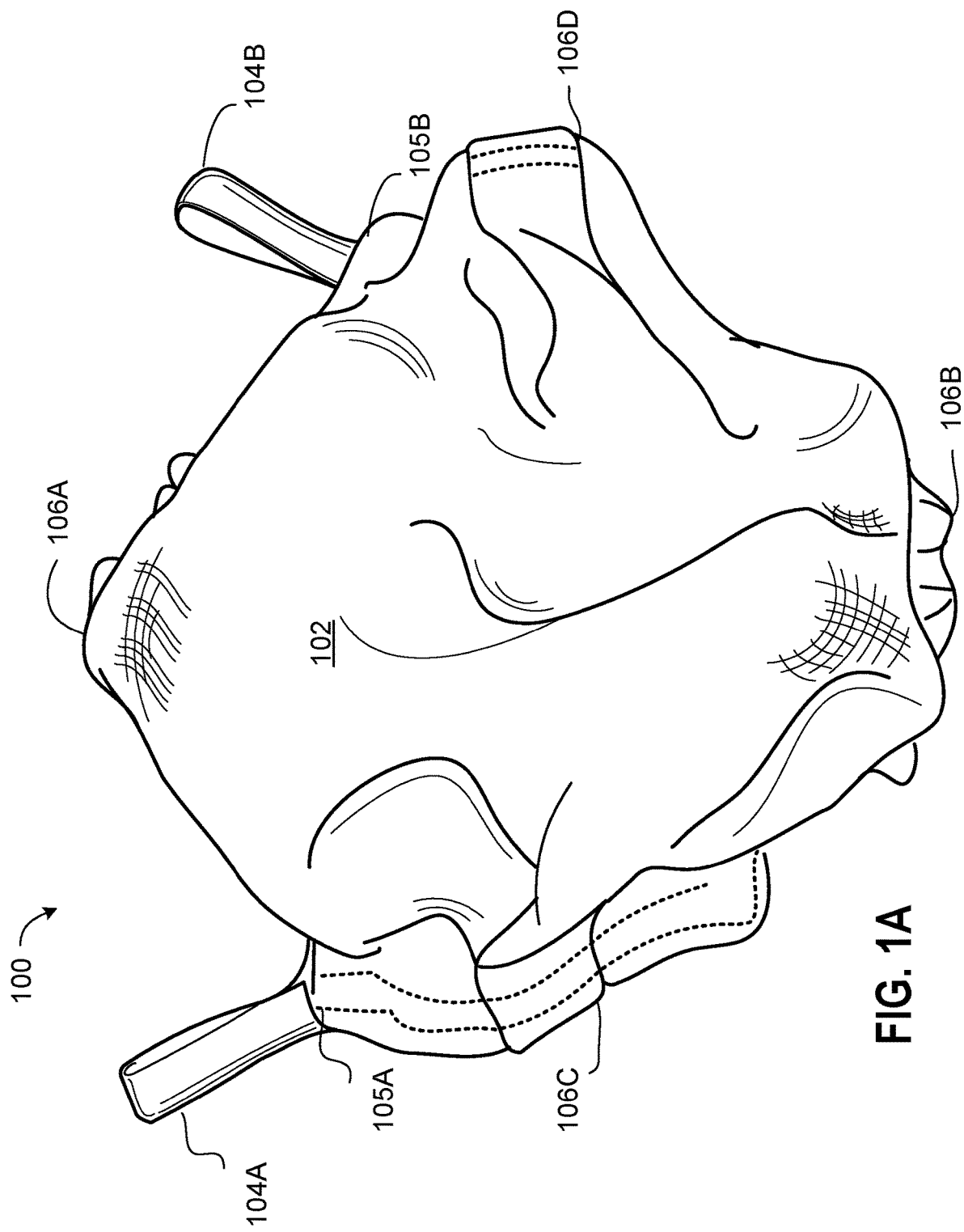
FIG. 1A is a front view of an example eyewear facemask.

Now referring to the figures, FIG. 1A is a front view of an example eyewear facemask 100. The facemask 100 can be one size fits all. In other implementations, the facemask 100 can be manufactured in one or more different sizes, such as small, medium, and large. For example, the facemask 100 can be manufactured in different sizes based on face size or shape of a user. The facemask 100 can also be manufactured in different sizes based on an age of the users. In yet other implementations, the facemask 100 can be manufactured in different sizes based on a type of eyewear worn with the facemask 100 (e.g., goggles, sunglasses, regular glasses, male glasses, child glasses, etc.) and/or a size/thickness of temples of eyewear. The facemask 100 can include a covering portion 102. The covering portion 102 can be made of a fabric or other textile. For example, the covering portion 102 can be cotton. The covering portion 102 can also be machine-washable. In some implementations, the covering portion 102 can include a textile filter.

The facemask 100 further has top edge 106A, bottom edge 106B, a first side edge 106C and a second side edge 106D. A first connector 104A can extend from the covering portion 102 of the facemask 100 and a second connector 104B can extend from the covering portion 102 of the facemask 100. The first and second connectors 104A-B can be loops that can wrap around temples of glasses or other eyewear. The connectors 104A-B can be made of an elastic material and can expand around different sized eyewear temples. As shown, the connectors 104A-B can be attached (e.g., sewn) into corners 105A-B of the covering portion 102. In some implementations, the connectors 104A-B can be adjustable. For example, the connectors 104A-B can include buckles, snaps, buttons, and/or hook and loop fasteners to adjust a size of the connectors 104A-B. By adjusting the size of the connectors 104A-B, the connectors 104A-B can be fitted around one or more different sizes temples of glasses or other eyewear. Therefore, in some implementations, the facemask 100 can be manufactured as a one-size-fits-all/one-size-fits-most, which can reduce production/manufacturing costs.

The facemask 100 therefore has the covering portion 102 sized and shaped to cover at least part of a user's nose and/or mouth, the first connector 104A positioned at the first top corner 105A of the covering portion 102, and the second connector 104B positioned at the second top corner 105B of the covering portion 102 opposite the first top corner 105A. As mentioned, the first connector 104A can be configured for attachment to a first temple of eyeglasses and the second connector 104B can be configured for attachment to a second temple of the eyeglasses when worn by a user. The first and second connectors 104A-B can each comprise an elastic material. In some embodiments, the first and second connectors 104A-104B need not include loops. For example, the first and second connectors 104A-B can be hooks or other connectors that can be used instead of (or in conjunction with) a loop.

Figure 1B:
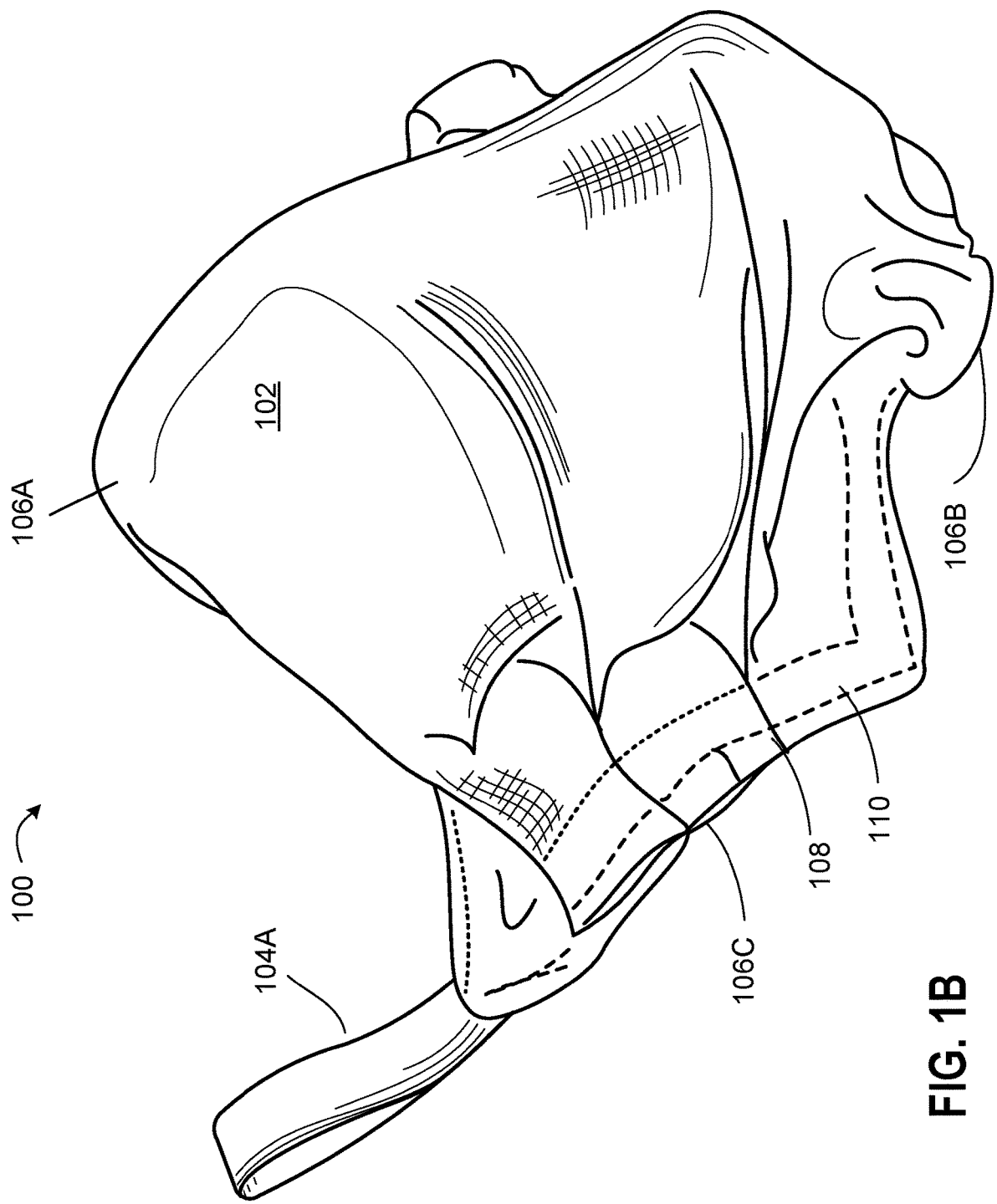
FIG. 1B is a side view of the eyewear facemask.

FIG. 1B is a side view of the eyewear facemask 100. As shown, the facemask 100 further can include expandable sections or pleats 108. In some implementations, the expandable sections 108 can be pleated along side edges 106C-D of the facemask 100. In other implementations, the expandable sections 108 can extend across the covering portion 102 from the first side edge 106C to the second side edge 106D. The expandable sections 108 can also extend only partially across the covering portion 102 from the first side edge 106C to the second side edge 106D. In some implementations, the expandable sections 108 can also be positioned along the top edge 106A, near the user's nose, and/or along the bottom edge 106B, near the user's chin.

In some embodiments, a different number of expandable sections 108 can be integrated into the facemask 100. For example, more expandable sections 108 can provide for more expansion or flexibility of the facemask 100 when worn by any size face of the user. As another example, fewer expandable sections 108 can be advantageous for users with smaller faces, such as children. The expandable sections 108 can be part of the covering portion 102 of the facemask 100. The expandable sections 108 can be configured to allow the facemask 100 to expand around the user's mouth, nose, and/or chin. Therefore, the facemask 100 can be worn by users having differently sized faces. The expandable sections 108 also allow for the facemask 100 to be comfortably worn without being pressed up against the user's nose, mouth, and/or chin. In other words, the expandable sections 108 provide for the covering portion 102 of the facemask to form into a cup shape that encloses around the user's nose, mouth, and chin. The cup shape can provide for more comfort and ability to speak, breathe, or otherwise move the nose, mouth, and/or chin underneath the facemask 100.

The facemask 100 also includes stitching 110. The stitching 110 can extend around a perimeter of the facemask 100 (e.g., along side edges 106A-D). The stitching 110 can be used to form one or more of the pleats or expandable sections 108. The stitching 110 can also be used to attach the loops or connectors 104A-B to corners of the covering portion 102. The stitching 110 can also be used to tighten portions of the covering portion 102 such that the facemask 100 can cup the user's face or at least their nose, mouth, and/or chin. For example, as shown, the bottom edge 106B can have stitching 110 that tightens the bottom edge 106B around the user's chin such that the facemask 100 can stay in place without having to use additional loops or connectors to retain a lower portion of the facemask to the user's face.

Figure 1C:
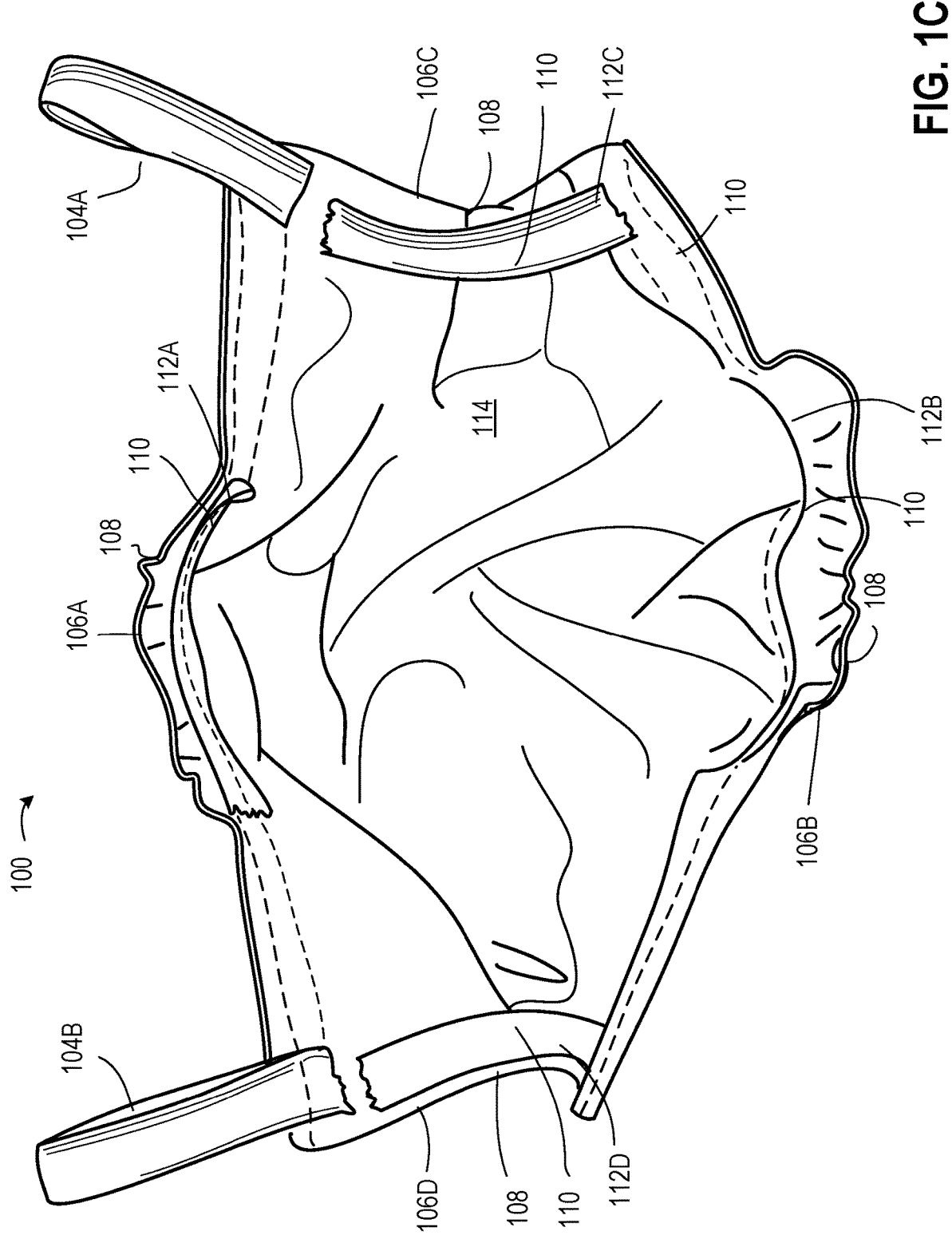
FIG. 1C is a view of an interior side of the eyewear facemask.

FIG. 1C is a view of an interior side 114 of the eyewear facemask 100. The facemask 100 can include elastic attachments or tensioners 112A-D. The elastic attachments 112A-D can be sewn into the interior side 114 of the facemask 100 using the stitching 110. Additional stitching can also be used to attach the elastic attachments 112A-D to the interior side 114 of the facemask. The elastic attachments 112A-D can be sewn all the way through the covering portion 102 with loosely sewn loops. The loosely sewn loops can provide for more flexibility of the facemask 100 to expand around and cup the user's face (e.g., when the user is talking with the facemask 100 on). The facemask 100 can be less rigid. The facemask 100 can also then be adapted to fit differently sized faces of users.

In some implementations, the elastic attachments 112A-D can be attached to the interior 114 using one or more other fasteners, such as hook and loop fasteners (such as hook and loop fasteners available from Velcro Inc., Applix Inc., or 3M Company), snaps, buttons, adhesives, rivets, or other fasteners suitable for the application. Such fasteners can be used in addition to, or instead of, the stitching 110. The elastic attachments 112A-D can be loosely attached to the interior 114 such that the facemask 100 can be expandable and secured to different sized faces of users. The elastic attachments 112A-D are also configured to provide for sides of the facemask 100 to be retained against the face when worn by the user. As a result, the facemask 100 may not require additional loops or connectors to attach to bottom corners of the facemask 100 to hold the facemask 100 against the user's face. Since fewer loops or connectors can be used to retain the mask to the user's face, the mask may be lightweight and more comfortable to wear.

As shown, a first elastic attachment 112A can be positioned at the top edge 106A on the interior side 114 of the covering portion 102 of the facemask 100. A second elastic attachment 112B can be positioned at the bottom edge 106B. A third elastic attachment 112C can be positioned at the first side edge 106C. A fourth elastic attachment 112D can be positioned at the second side edge 106D. In some implementations, fewer or additional elastic attachments can be positioned on the interior 114 of the covering portion 102 of the facemask 100.

The first elastic attachment 112A can be advantageous to secure the facemask 100 against the bridge of the user's nose. As a result, the facemask 100 can be positioned beneath/under eyewear worn by the user. The elastic attachment 112A can also be advantageous to reduce fogging of lens of the eyewear. In some implementations, the top edge 106A can additionally or alternatively include a metal wire or more rigid structure that is configured to bend/fold around the bridge of the user's nose. This configuration can provide for the mask to be securely retained against the user's face. The second elastic attachment 112B can be advantageous to hold the facemask 100 in place on the user's face. The second elastic attachment 112B can secure under the user's chin and cinch the facemask 100 in place. Moreover, the third and fourth elastic attachments 112C-D can be advantageous to form the cup shape of the covering portion 102, as described herein. The attachments 112C-D can also be advantageous to secure the facemask 100 to the user's face to reduce fogging of the lens of eyewear worn by the user with the facemask 100.

In some implementations, the first elastic attachment 112A can be positioned laterally along the top edge 106A of the interior side 114 of the covering portion 102. The second elastic attachment 112B can be positioned laterally along the bottom edge 106B of the interior side 114 of the covering portion 102. The third elastic attachment 112C can be positioned vertically along the first side edge 106C of the interior side 114 of the covering portion 102. The fourth elastic attachment 112D can be positioned vertically along the second side edge 106D of the interior side 114 of the covering portion 102. The first, second, third, and fourth elastic attachments 112A-D can be configured to form a cup shape of the covering portion 102, wherein the cup shape of the covering portion 102 encloses at least part of the user's nose, mouth, and/or chin. The first, second, third, and fourth elastic attachments can be sewn loosely to the expandable sections 108 of the covering portion 102 of the facemask 100, wherein the expandable sections 108 of the covering portion 102 are pleated.

FIG. 2A depicts the eyewear facemask 100 and eyewear 200. In this example, the eyewear 200 can be sunglasses. In other implementations, the eyewear 200 can be other types of glasses and/or goggles. The glasses 200 include lenses 204, a first temple 202A, a second temple 202B, a first temple tip 210A (e.g., earpiece), a second temple tip 210B (e.g., earpiece), a bridge 206, and nose pads 208. The user can pair the facemask 100 with many types of eyewear 200 that are suitable for the application. In some implementations, the facemask 100 can be purchased separately from the eyewear 200. In other implementations, the facemask 100 can be purchased/sold with the eyewear 200. In such implementations, the facemask 100 can still be worn with one or more different types of eyewear.

Figure 2B:
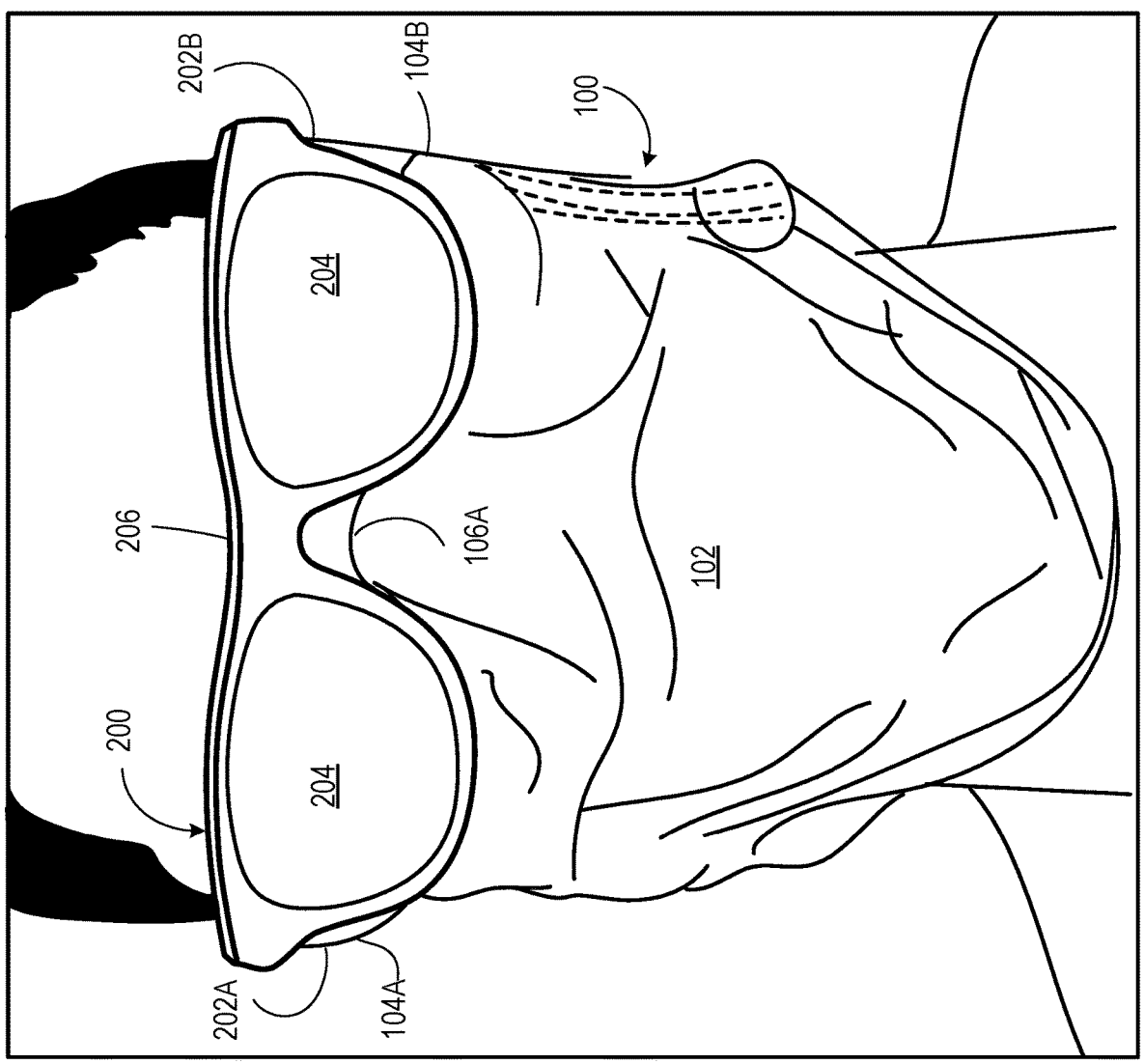
FIG. 2B depicts a front view of the eyewear facemask and the eyewear when worn by a user.

FIG. 2B depicts a front view of the eyewear facemask 100 and the eyewear 200 when worn by a user. As shown, the loops or connectors 104A-B can be looped around the first and second temples 202A-B, respectively. The user can adjust a position of the connectors 104A-B along the first and second temples 202A-B to adjust how the facemask 100 conforms to the shape of the user's face. When worn with the eyewear 200, the top edge 106A can be retained against the user's nose such that the facemask 100 remains beneath the lens 204 of the eyewear 200. As a result, the lens 204 may not fog up from the user breathing or talking through the facemask 100.

Figure 2C:
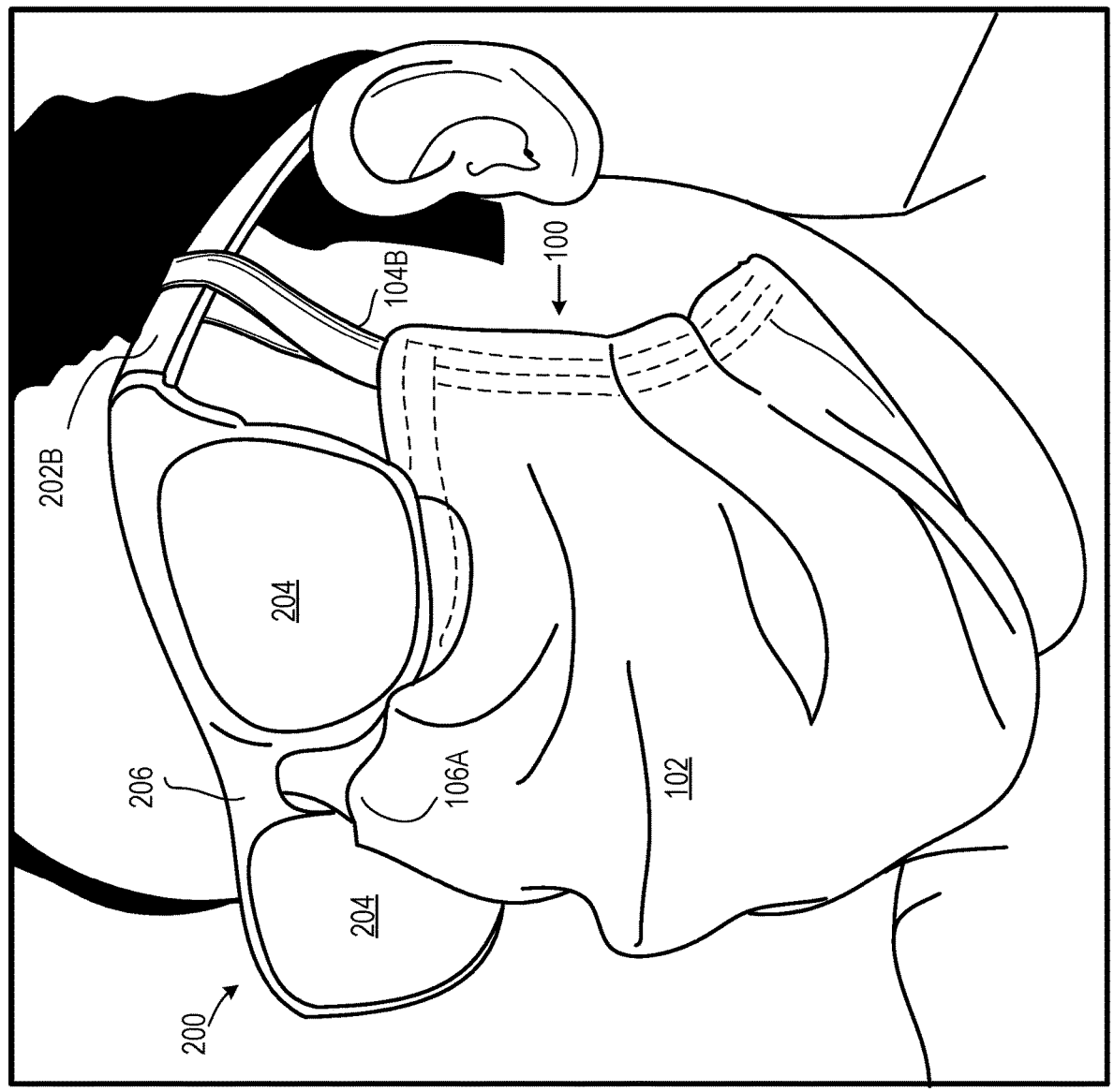
FIG. 2C depicts a perspective view of the eyewear facemask and the eyewear when worn by the user.

FIG. 2C depicts a perspective view of the eyewear facemask 100 and the eyewear 200 when worn by the user. As shown, the connector 104B of the facemask 100 is positioned along a midway point on the second temple 202B of the eyewear 200. The facemask 100 is retained against the face of the user by the elastic attachments sewn into the interior side of the facemask 100, as described herein. Thus, there may be no additional loop or connector along sides of the facemask 100 to retain the facemask 100 to the user's face. Moreover, as depicted, the facemask 100 has a cup shape that secures the facemask 100 beneath the user's chin.

Figure 2D:
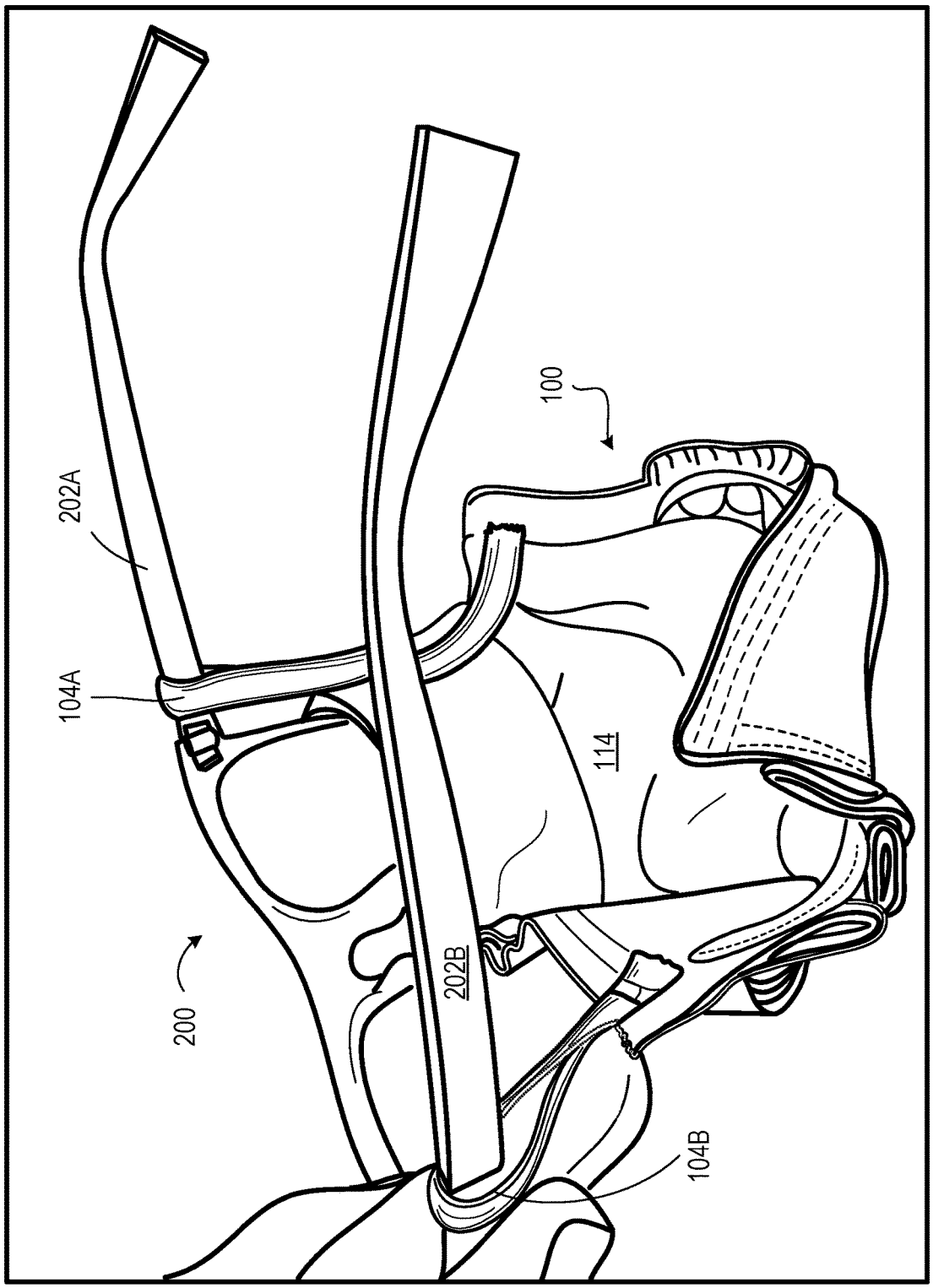
FIGS. 2D-2F depict perspective views of the interior side of eyewear facemask when the facemask is removably attached to the eyewear.
Figure 2E:
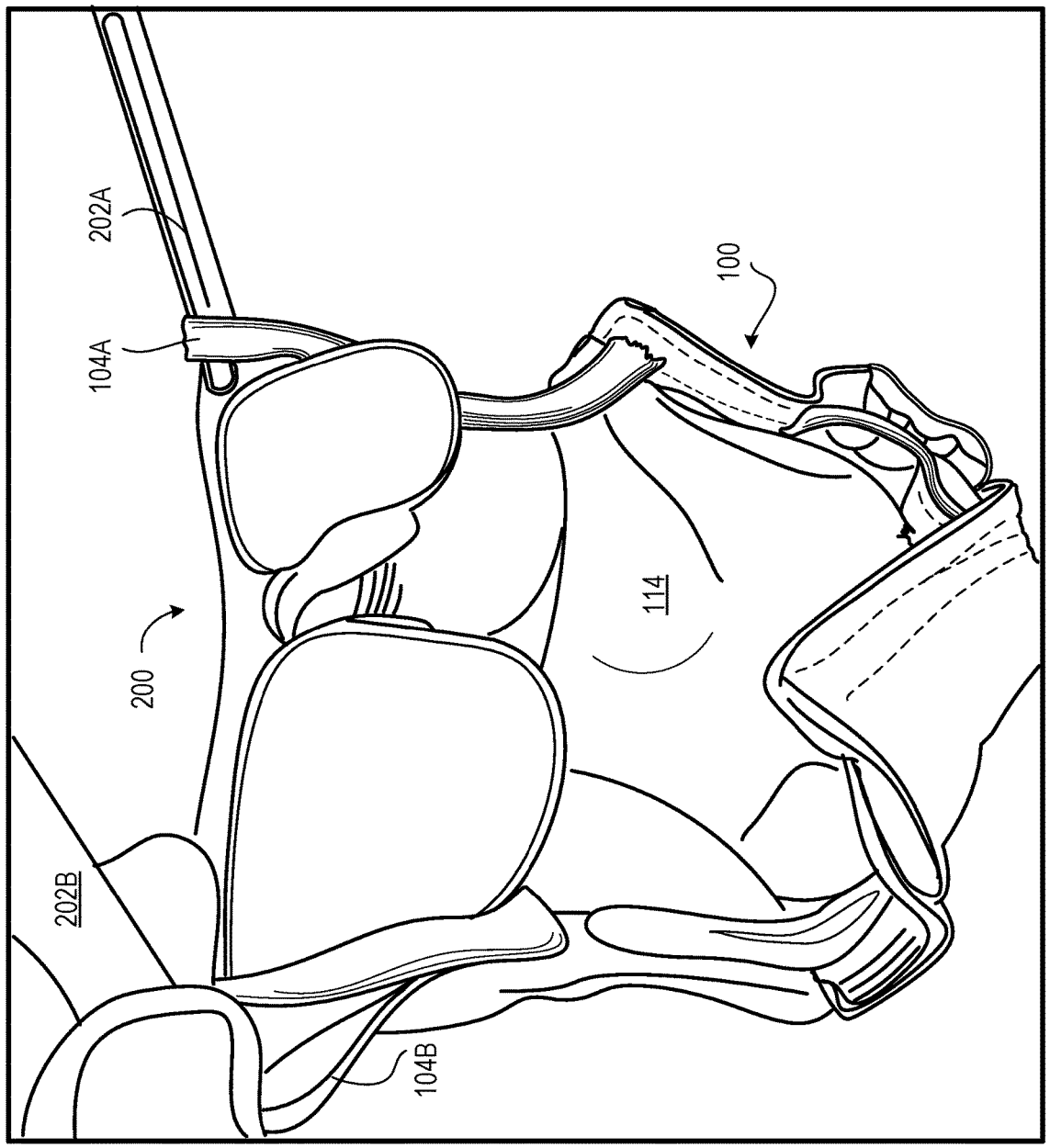
Figure 2F:
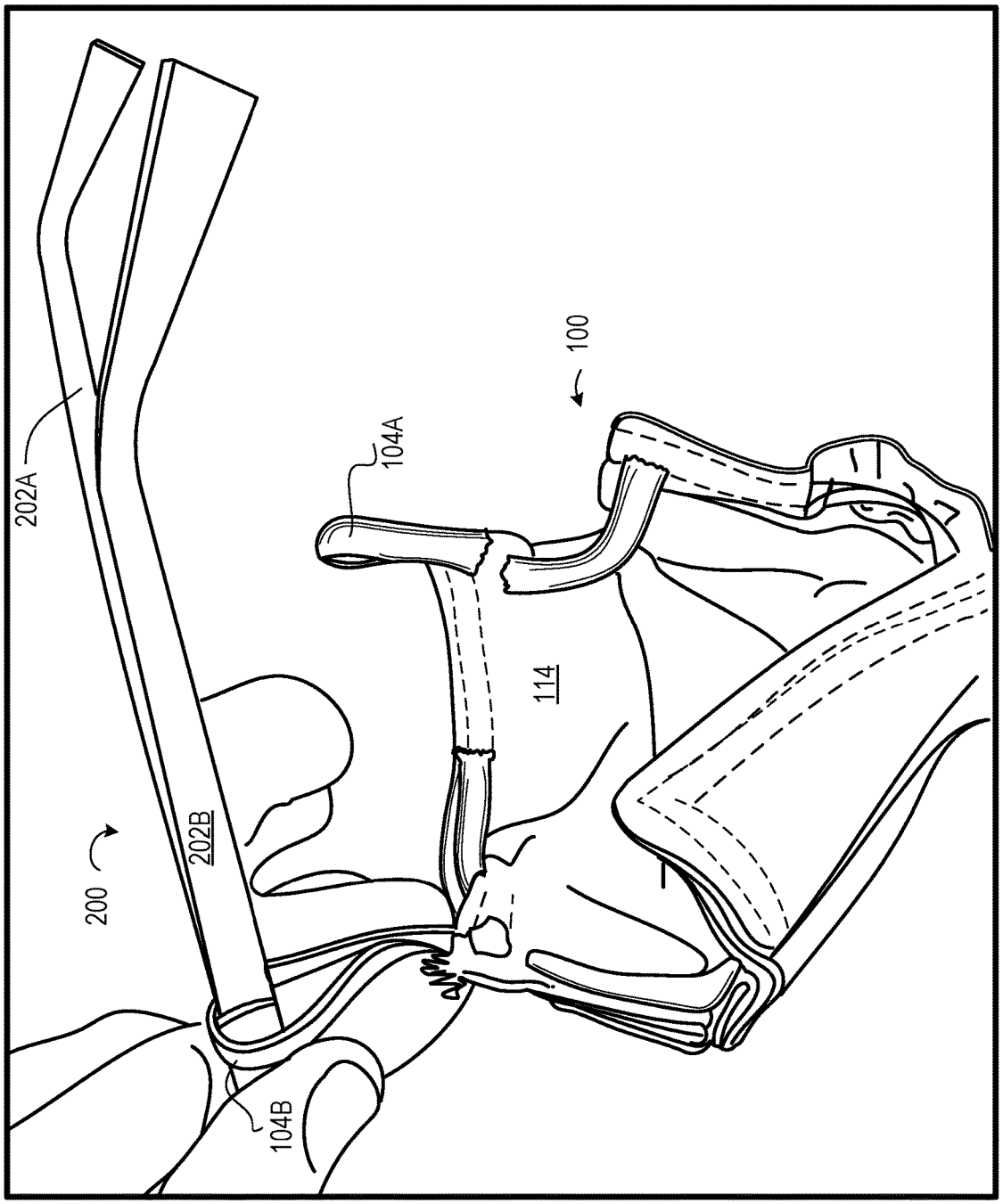

FIGS. 2D-F depict perspective views of the interior side 114 of eyewear facemask 100 when the facemask 100 is removably attached to the eyewear 200. Referring to FIGS. 2D, 2E, and 2F, the connectors 104A and 104B are attached around the temples 202A and 202B, respectively. The connectors 104A-B are positioned closer to a front of the eyewear 200 or the lens. As mentioned, the connectors 104A-B can slide along a length of the temples 202A-202B to provide for more comfort and/or better fit depending on the user's face shape/size and/or the size/shape of eyewear worn by the user. FIG. 2F demonstrates that, to attach the facemask 100 to the eyewear 200, the user can slide each of the connectors 104A-B onto the first and second temples 202A-B, respectively.

Still referring to FIGS. 2D-F, the eyeglasses 200 can be configured to be worn by the user, the eyeglasses 200 having first and second temples 202A-B to extend at least partially behind ears of the user to secure the eyeglasses 200 to the face of the user. The facemask 100 can be removably attached to the eyeglasses 200 when worn by the user, the facemask 100 having the covering portion 102 sized and shaped to cover at least part of the user's nose and/or mouth, the first connector 104A extending from the covering portion 102 to the first temple 202A of the eyeglasses 200, and the second connector 104B extending from the covering portion 102 to the second temple 202B of the eyeglasses 200.

Figure 3:
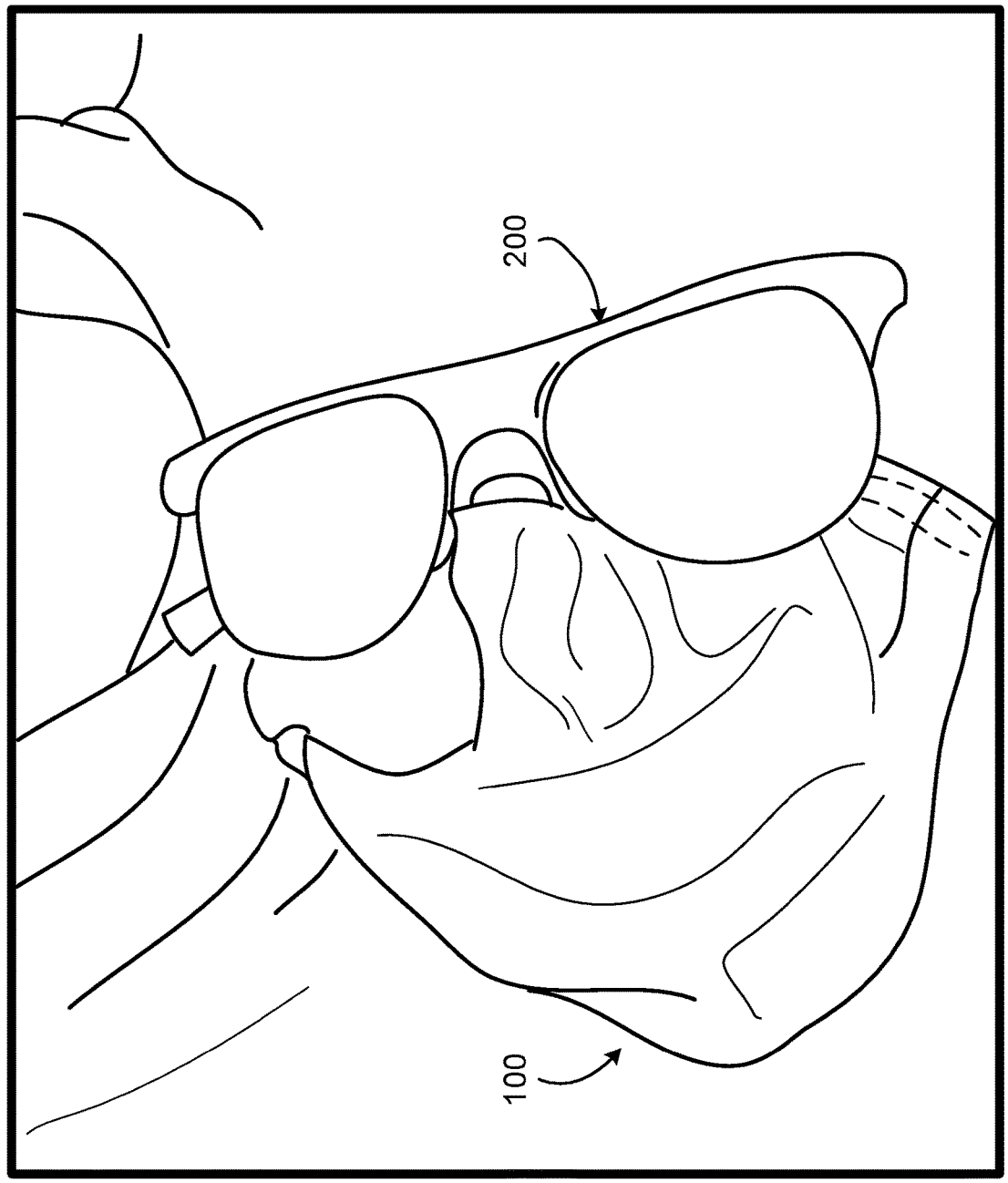
FIG. 3 depicts an example attachment of the eyewear facemask to the eyewear.

FIG. 3 depicts an example attachment of the eyewear facemask 100 to the eyewear 200 when the facemask 100 and the eyewear 200 are not worn on the face. The user may desire to carry the facemask 100 and eyewear 200 together. Doing so can prevent the user from losing the facemask 100 and/or the eyewear 200. The user may also desire to carry the facemask 100 and eyewear 200 together to make it easier and/or faster to put on the facemask 100 and/or eyewear 200. The user may not have to attach the facemask 100 to the eyewear 200 for every use. Therefore, the facemask 100 can remain attached to the eyewear 200 and the user can wear the eyewear 200 looped on the user's shirt or other garments. The facemask 100 and the eyewear 200 can also remain attached together when stowed in an eyewear box, bag, or other item. The facemask 100 can remain attached to the eyewear 200 and therefore may not become lost or detached when the eyewear 200 is looped/hooked onto the user's garments/clothing or otherwise stored by the user.

FIG. 4A depicts a side view of another example eyewear facemask 400 attached to eyewear 200. As shown and described in reference to the facemask 100 depicted and described throughout this disclosure, the facemask 400 can have one or more of the same components as the facemask 100. For example, the facemask 400 includes loops or connectors 404A-B, which can be configured to attach to or loop around the first and second temples 202A-B of the eyewear 200. The facemask 400 also includes a covering portion 402. In comparison to the covering portion 102 of the facemask 100, the covering portion 402 includes a pattern or design. The covering portion 402 can have one or more different patterns or designs that the user can choose from. In the example facemask 400, the covering portion 402 has a sports team design.

Figure 4B:
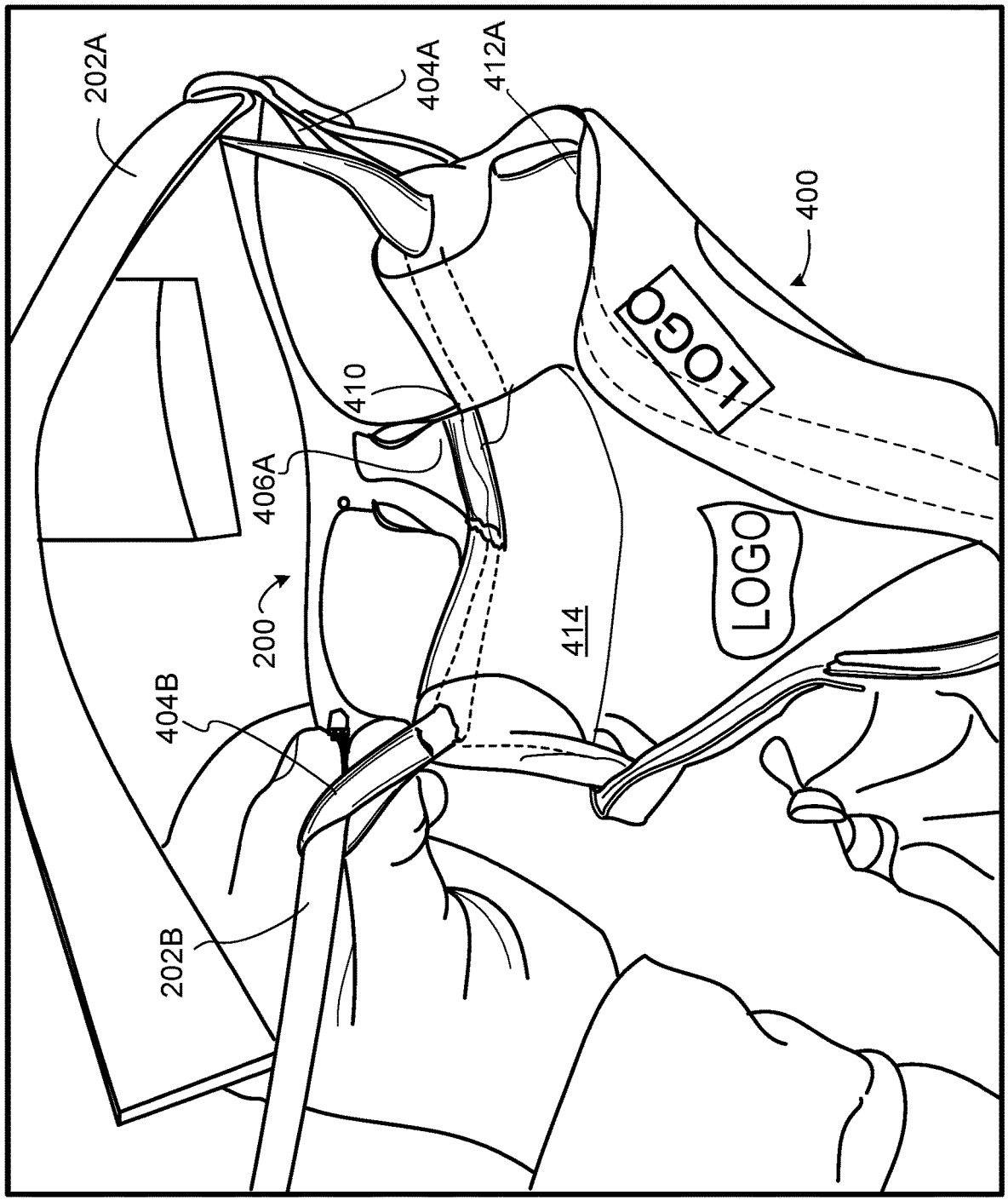
FIGS. 4B-4C depict views of an interior side of the eyewear facemask of FIG. 4A when removably attached to the eyewear.
Figure 4C:
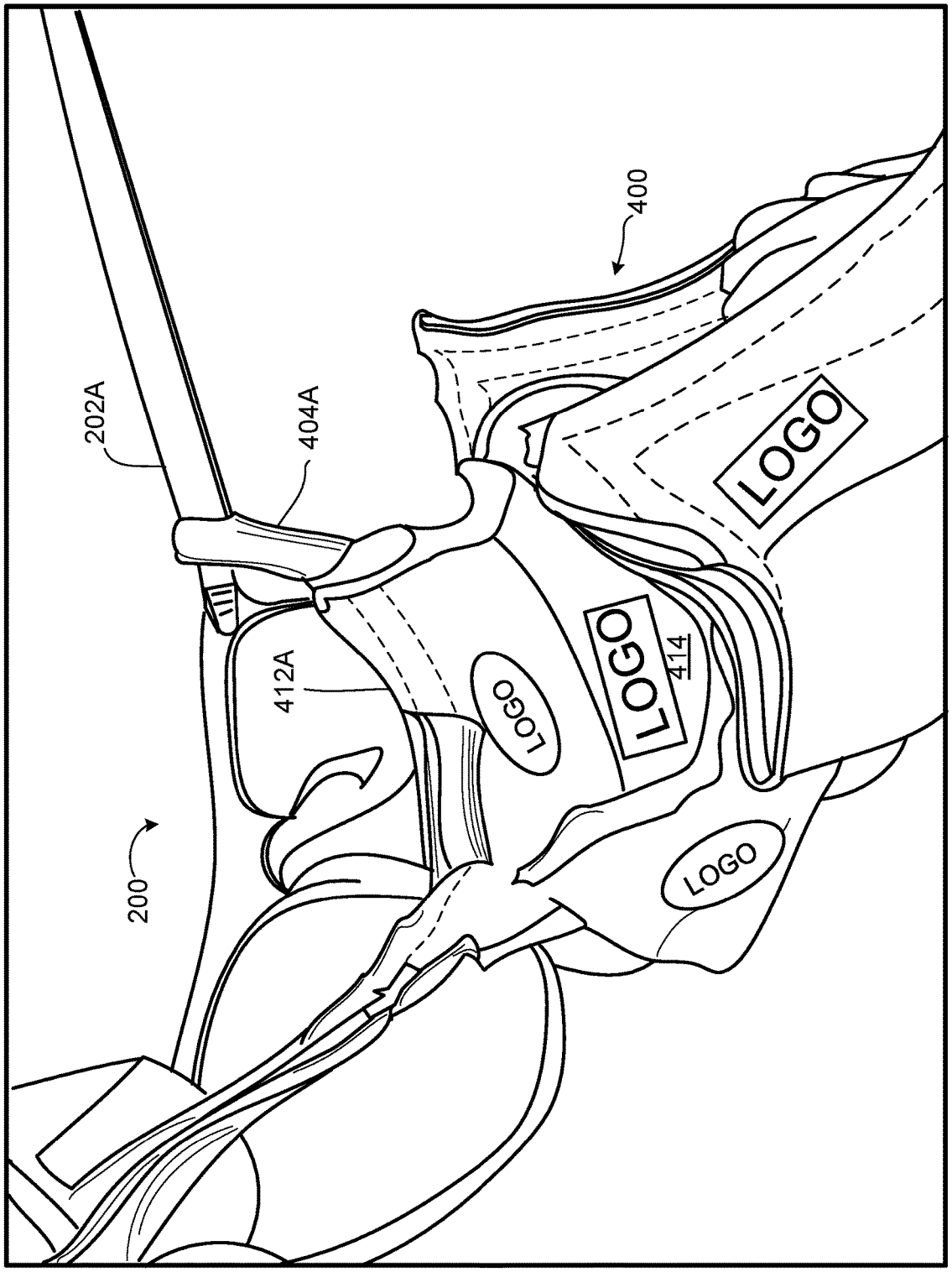

FIGS. 4B-4C depict views of an interior side 414 of the eyewear facemask 400 of FIG. 4A when removably attached to the eyewear 200. As described in reference to the facemask 100, the facemask 400 includes an elastic attachment 412A along a top edge 406A of the interior side 414 of the facemask 400. The facemask 400 also includes additional elastic attachments along a bottom edge and first and second side edges of the facemask 400 to retain the facemask 400 to the user's face (e.g., refer to FIGS. 1-2).

Figure 5A:
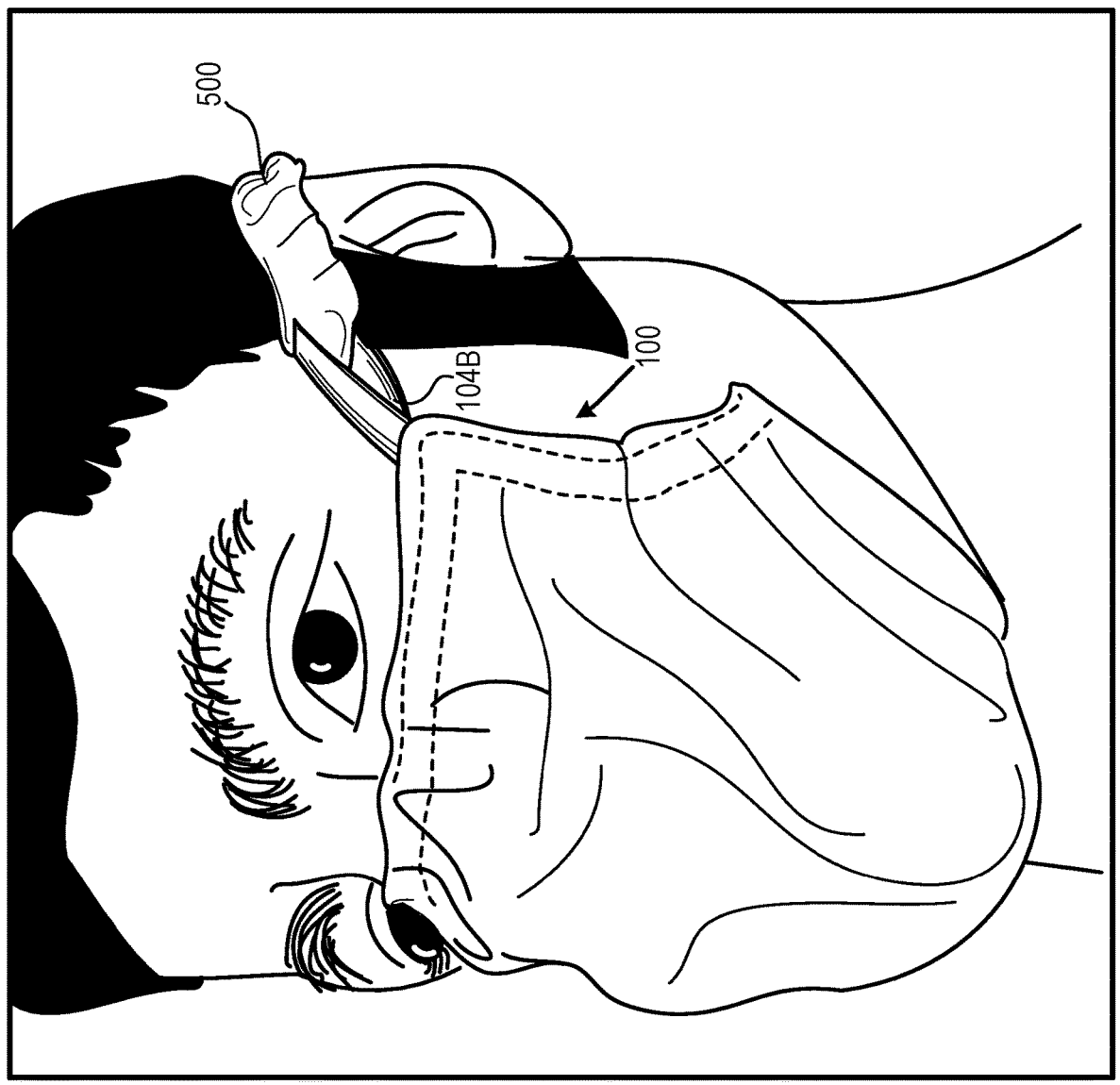
FIG. 5A depicts the eyewear facemask worn by the user with an example removable strap.

FIG. 5A depicts the eyewear facemask 100 worn by the user with an example removable strap 500. The removable strap 500 can be configured to removably attach to the first and second connectors 104A-B of the facemask 100 when the user is not wearing the eyeglasses 200 with the facemask 100. As a result, the facemask 100 can be worn in different configurations, with or without glasses or other eyewear.

Figure 5B:
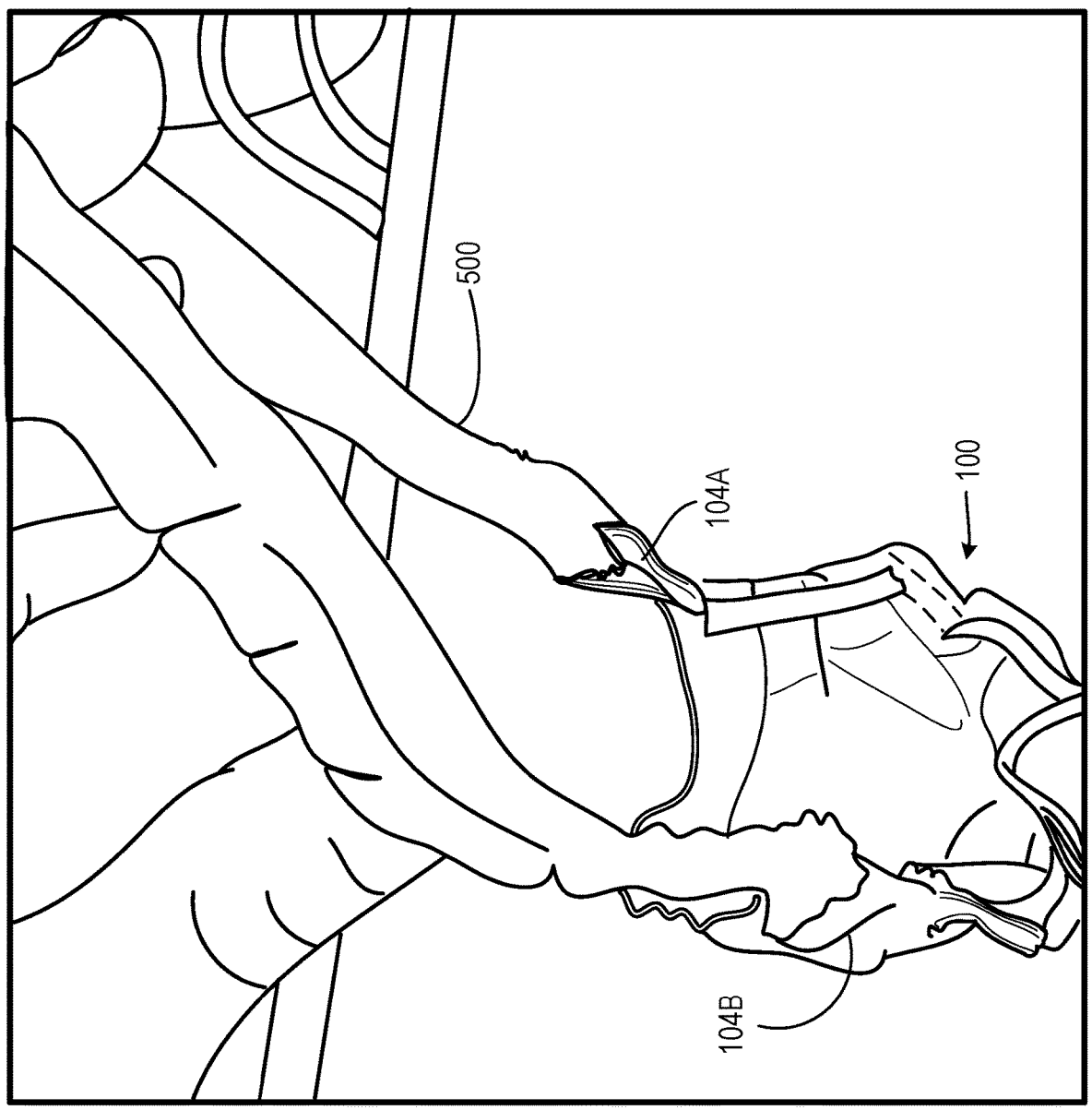
FIG. 5B depicts the eyewear facemask with the removable strap attached thereto.

FIG. 5B depicts the eyewear facemask 100 with the removable strap 500 attached thereto. As shown, the removable strap 500 can loop around or attach to the connectors 104A-B of the facemask 100. The removable strap 500 can then wrap around a back of the users head when the facemask 100 is worn by the user. Therefore, the facemask 100 need not be retained to the user's face by wrapping the connectors 104A-B around the user's ears. The configuration depicted in FIGS. 5A-G can be advantageous to provide a relatively comfortable way for the facemask 100 to be worn by the user when the user is not wearing eyeglasses. Moreover, weight of the facemask 100 can be distributed to the back of the user's head rather than at the user's ears. This configuration can make the facemask 100 feel lightweight and comfortable. In some implementations, the user can retain the facemask 100 to their face with the removable strap 500 while also wearing a pair of glasses or eyewear. The user may not have to attach the connectors 104A-B of the facemask 100 to the temples of the eyewear since the user can retain the facemask 100 to their face using the removable strap 500.

Figure 5C:
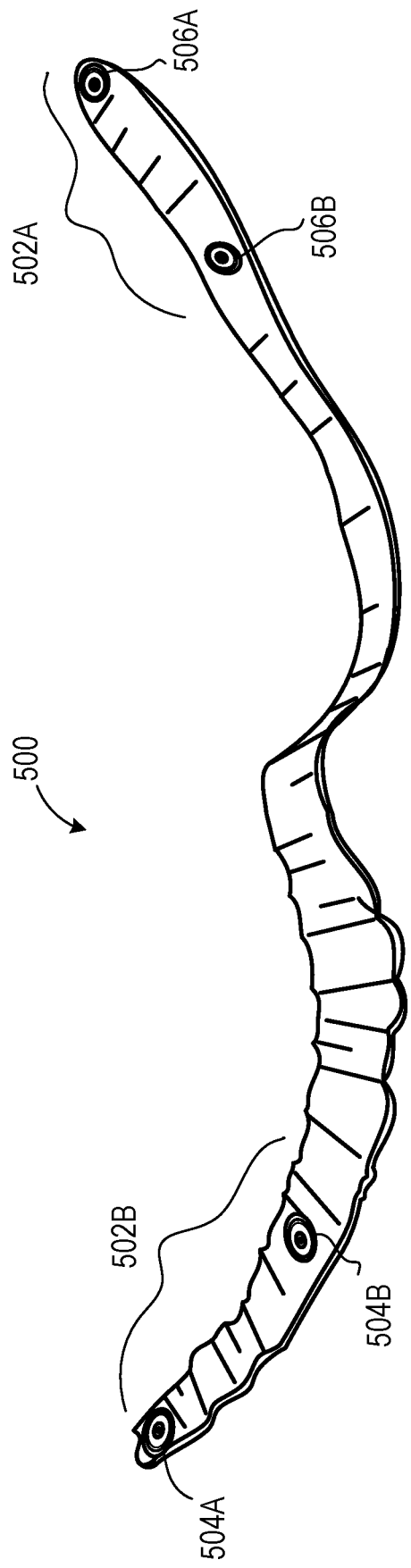
FIG. 5C depicts the removable strap.

FIG. 5C depicts the removable strap 500. The removable strap 500 can be made of an elastic material or fabric that can be expanded to fit around different sized/shaped heads of users. The strap 500 can include end portions 502A-B. The first end portion 502A can have fasteners 504A-B and the second end portion 502B can have fasteners 506A-B. The fasteners 506A-B can be used to attach each of the first and second end portions 502A-B to the connectors 104A-B of the facemask 100, respectively. In other words, the first end portion 502A can be configured to loop around the first connector 104A and the second end portion 502B can be configured to loop around the second connector 104B. As shown in FIG. 5C, the fasteners 504A-B and 506A-B can be snaps. In some embodiments, the fasteners 504A-B and 506A-B can instead be hook and loop fasteners, buckles, buttons, or other fasteners suitable for the application. In other embodiments, the removable strap 500 can attach to the first and second connectors 104A-B (or other features of the facemask 100) via another mechanism suitable for the application.

In some implementations, the first and second end portions 502A-B can be made from a more rigid material than the elastic material of other portions of the strap 500. In other implementations, the first and second end portions 502A-B can be made from elastic material like other portions of the strap 500.

In some implementations, although not depicted, the removable strap 500 can include a tightening mechanism to adjust the removable strap 500 around the back portion of the head of the user. Therefore, the removable strap 500 can be a one size fits all strap that is sold/manufactured with the facemask 100. In other implementations, the removable strap 500 can be manufactured in different sizes, such as small, medium, and large to accommodate for different sized heads of users.

Figure 5D:
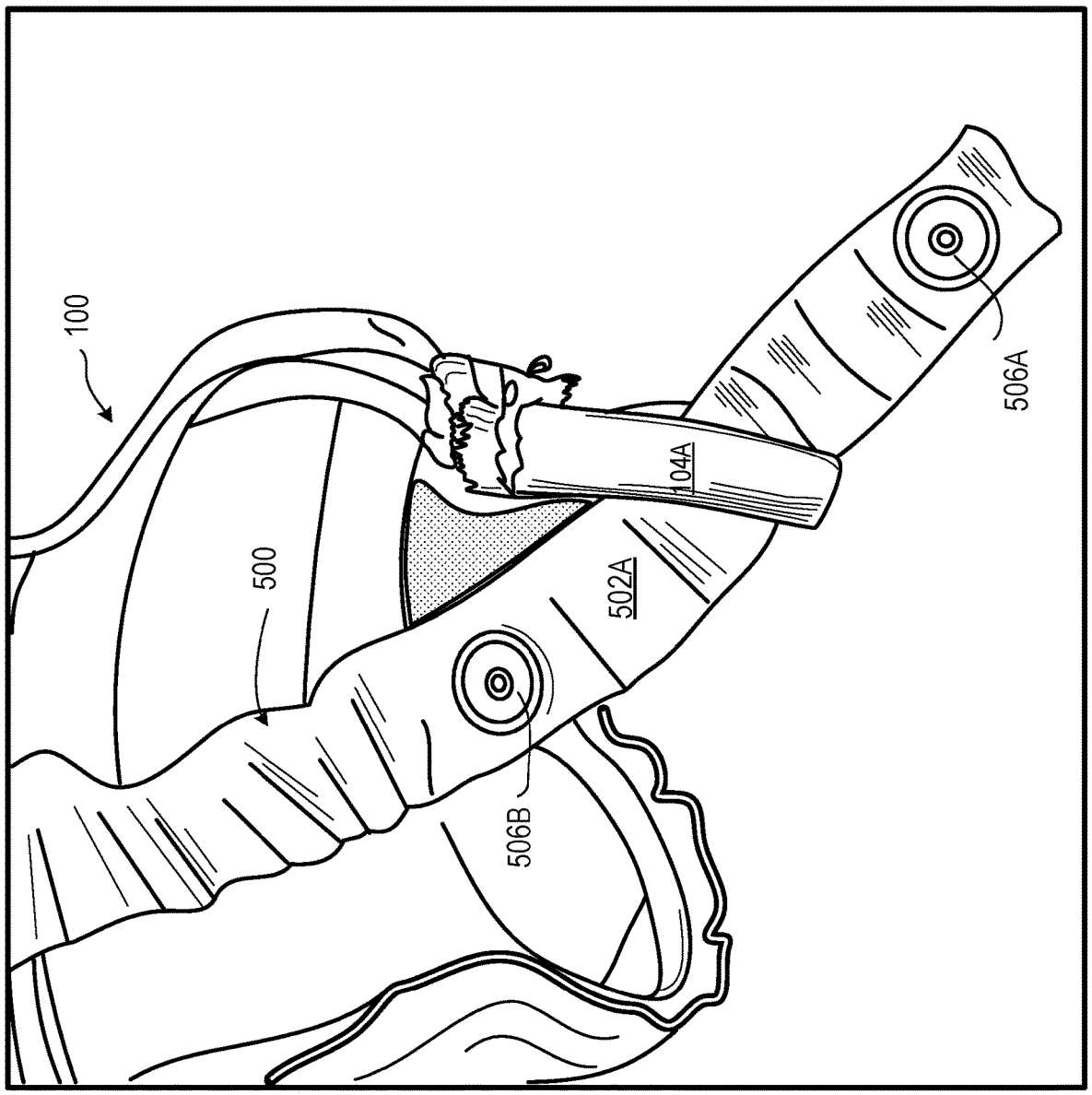
FIGS. 5D-5F depict attaching means of the removable strap used for attaching the strap to the eyewear facemask.
Figure 5E:
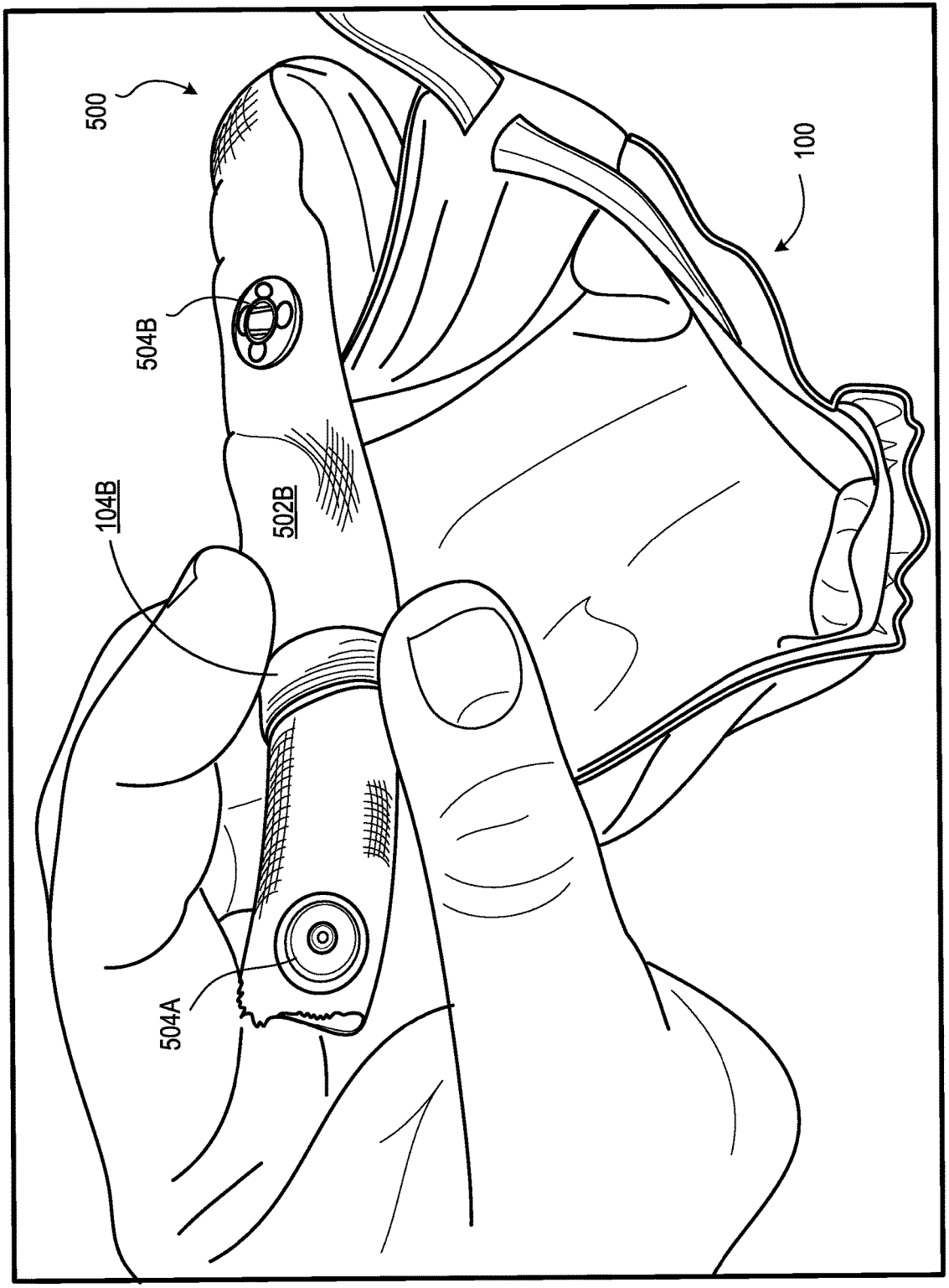
Figure 5F:
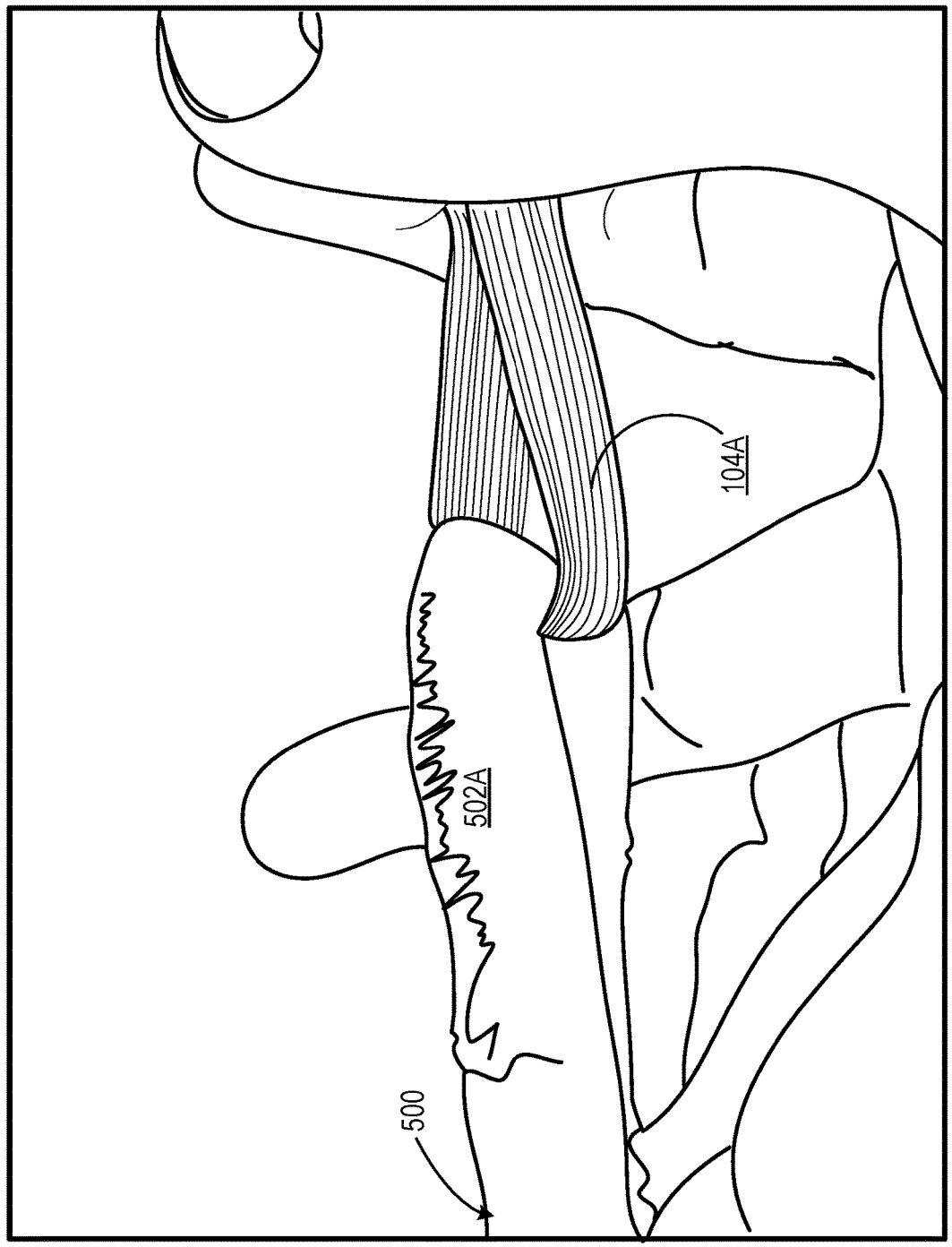

FIGS. 5D-5F depict attaching means of the removable strap 500 used for attaching the strap 500 to the eyewear facemask 100. As shown in FIG. 5D, the first end portion 502A can loop through the first connector 104A of the facemask 100. The snaps 506A-B can then be attached to each other to secure the first end portion 502A of the strap 500 to the facemask 100. As shown in FIG. 5E, the second end portion 502B can loop through the second connector 104B of the facemask 100. The snaps 504A-B can then be attached to each other to secure the second end portion 502B of the strap 500 to the facemask 100. FIG. 5F demonstrates the first end portion 502A secured and fastened around the first connector 104A.

Figure 5G:
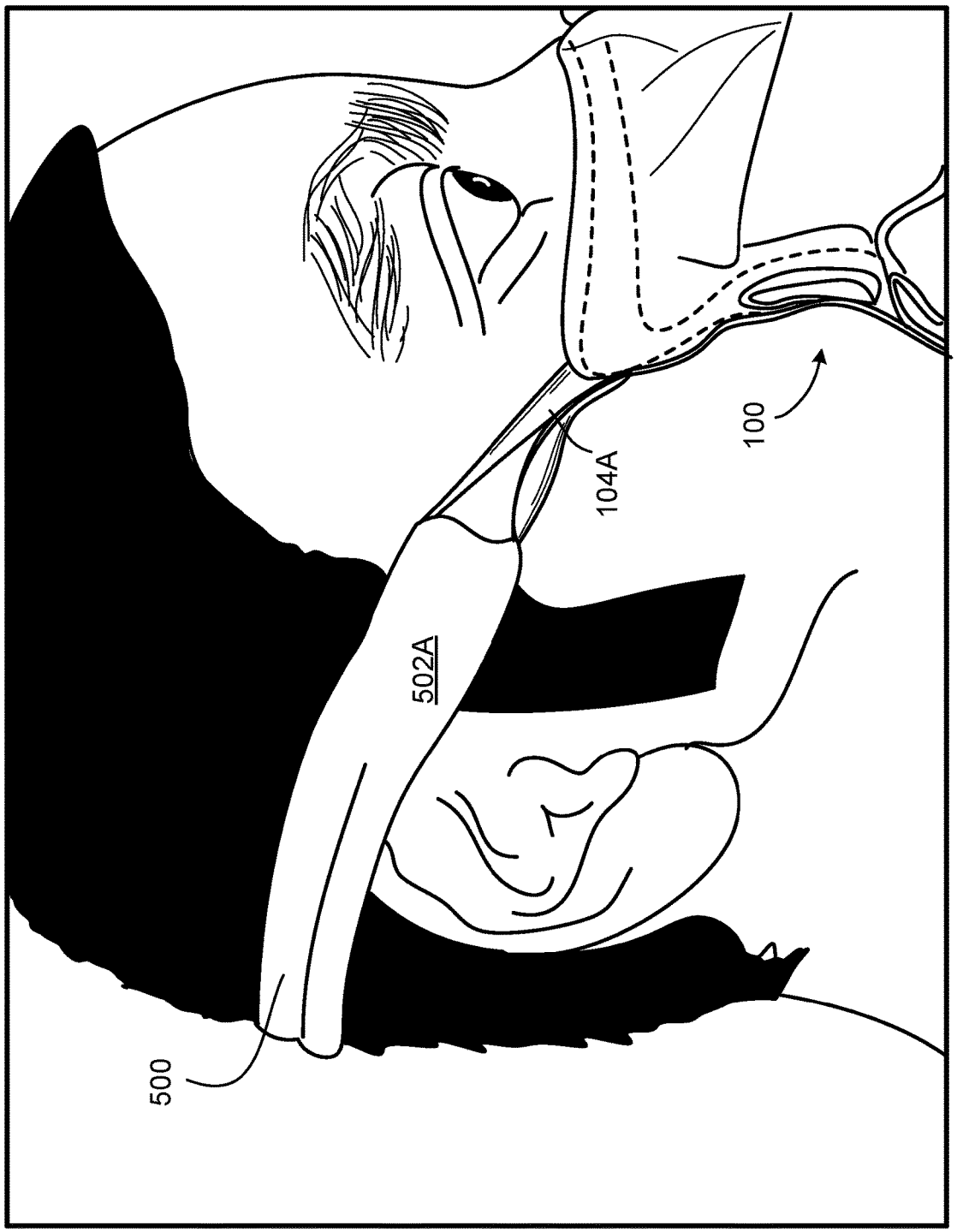
FIG. 5G depicts a side view of the eyewear facemask when worn with the removable strap.
Figure 6A:
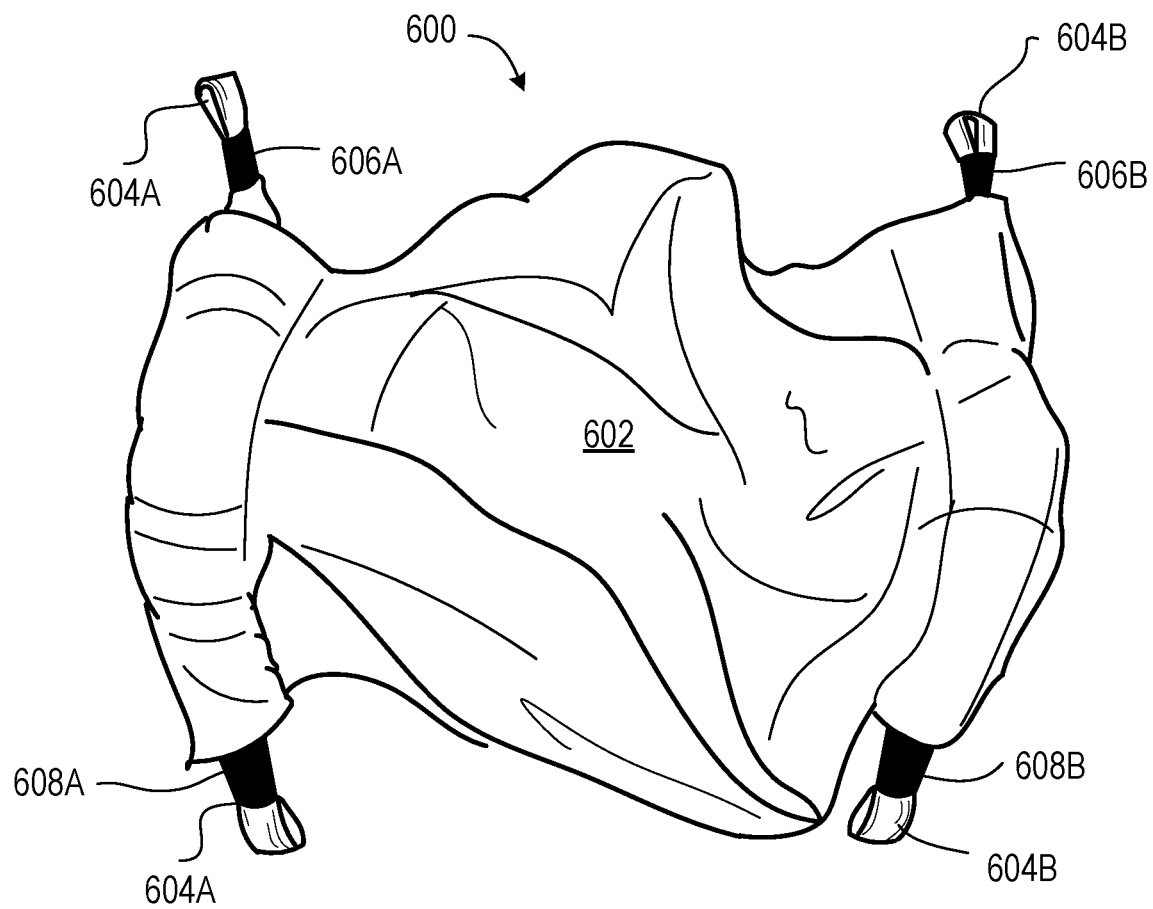
FIG. 6A is a front view of another example eyewear facemask.

FIG. 5G depicts a side view of the eyewear facemask 100 when worn with the removable strap 500. As shown, the first end portion 502A is secured/fastened around the first connector 104A of the facemask 100. The removable strap 500 extends above the user's ear and around the back portion of the user's head. The user can adjust a height of the strap 500 around the user's head based on the user's comfort needs. Once the facemask 100 is retained against the user's face via the removable strap 500, the mask can be comfortably worn on the user's face, covering their nose, mouth, and chin, as previously described throughout this disclosure. FIG. 6A is a front view of another example eyewear facemask 600. The facemask 600, like the facemask 100 described herein, can include a covering portion 602, a first connector 604A, and a second connector 604B. The first connector 604A can extend along a first side of the facemask 600 and through the covering portion 602. The second connector 604B can extend along a second side of the facemask 600 and through the covering portion 602. In other words, the first and second connectors 604A-B can go through passages or other suitable structure at the sides of the facemask 600 instead of being stitched to the facemask 600. As shown in the FIG. 6A, the connectors 604A-B can each be continuous loops that extend out from ends of the facemask 600. As a result, the connectors 604A-B can be fully adjustable to fit any size face of a user. The user can pull ends of the connectors 604A-B to tighten or expand the facemask 600 around the user's face.

Moreover, the user can secure a desired length of the connectors 604A-B using grummets 606A, 606B, 608A, and 608B. The grummets 606A-B and 608A-B can be moved along the length of the connectors 604A-B to tighten or loosen the connectors 604A-B, thereby adjusting the size of the connectors 604A-B so that the facemask 600 can be fully adjustable and worn by users having different sized faces as well as different types of eyewear. For example, the user can use the grummets 606A-B to secure top portions of the connectors 604A-B around different sized eyewear. The user can also tighten or loosen the grummets 608A-B at bottom portions of the connectors 604A-B to tighten or loosen fit of the covering portion 602 over the user's face. The grummets 606A-B and 608A-B can also be fasteners, cord locks or similar fasteners for adjusting and securing the desired length of the connectors 604A-B. The fully-adjustable facemask 600 can be advantageous to reduce manufacturing costs since one size can fit most or all users. Moreover, the facemask 600 can reduce fogging of lens of eyewear when worn with the facemask 600.

Figure 6B:
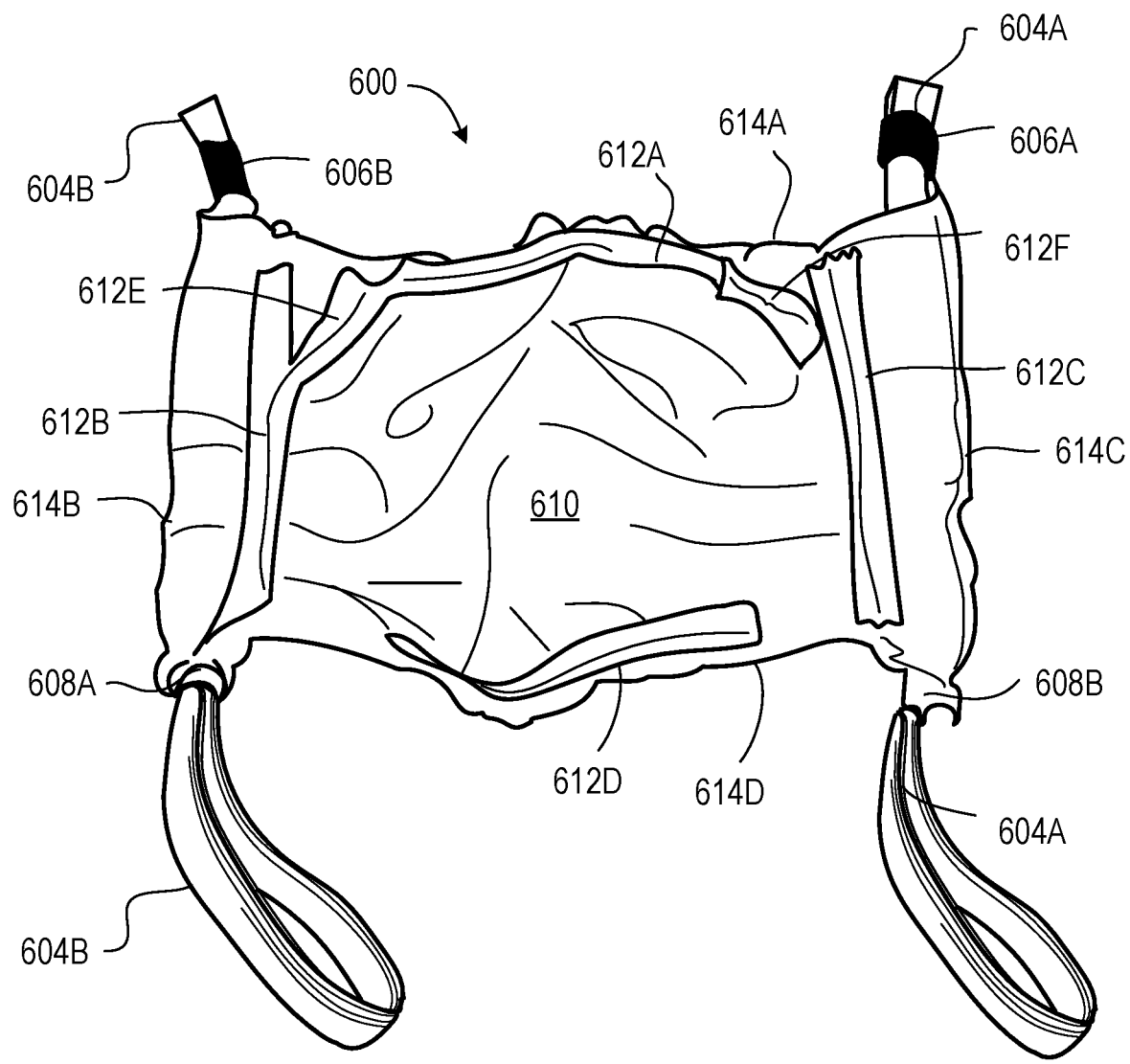
FIG. 6B is a view of an interior side of the eyewear facemask of FIG. 6A.

FIG. 6B is a view of an interior side 610 of the eyewear facemask 600 of FIG. 6A. In this example, the connectors 604A-B can have a longer length when extending from the bottom portion of the facemask 600. The connectors 604A-B can also have a shorter length when extending from the bottom portion of the facemask 600, as shown in FIG. 6A. Moreover, the connectors 604A-B can be pulled up from the top portion of the facemask 600 such that an equal amount of the connectors 604A-B extend from both the top and bottom portions of the facemask 600.

Similar to the facemask 100 described herein, the facemask 600 includes elastic attachments 612A-F integrated or sewn into the interior side 610. A first elastic attachment 612A can be positioned at a top edge 614A on the interior side 610 of the facemask 600. A second elastic attachment 612B can be positioned at a first side edge 614B. A third elastic attachment 612C can be positioned at a second side edge 614C. A fourth elastic attachment 612D can be positioned at a bottom edge 614 of the facemask 600. Moreover, a fifth elastic attachment 612E can be positioned at a corner of the top edge 614A and the first side edge 614B. A sixth elastic attachment 612F can be positioned at a corner of the top edge 614A and the second side edge 614C. The fifth and sixth elastic attachments 612E and 612F can be angled and integrated into the corners as described herein, thereby having an improved effect on reducing fog buildup on lens of eyewear. In some implementations, fewer or additional elastic attachments can be positioned on the interior side 610 of the facemask 600. For example, seventh and eight elastic attachments can be positioned at corners of the bottom edge 614D and the first side edge 614B and the second side edge 614C, respectively. In some implementations, one continuous elastic attachment can be integrated into portions of the interior side 610 of the facemask 600.

Figure 6C:
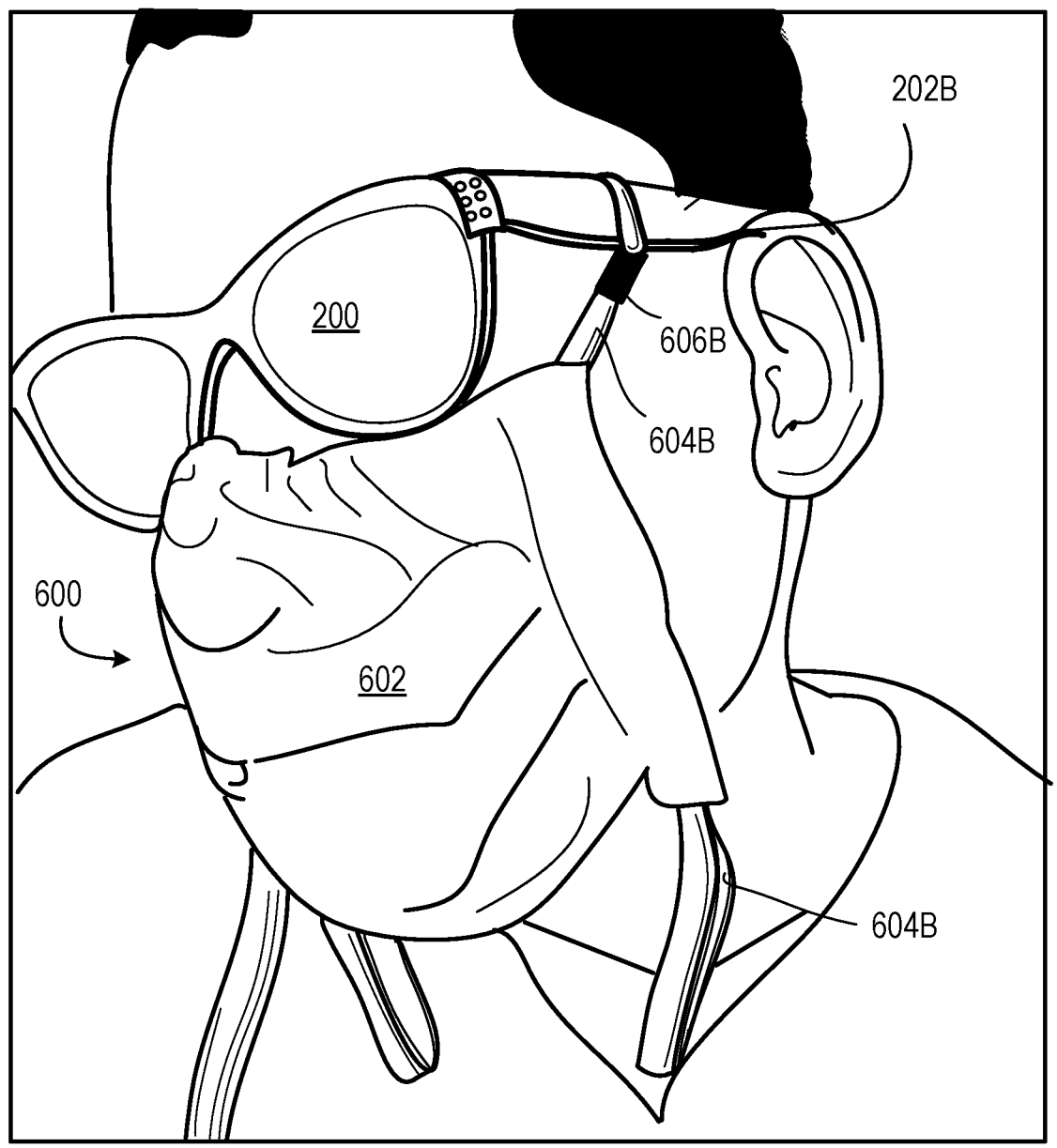
FIG. 6C depicts a perspective view of the eyewear facemask of FIG. 6A and eyewear when worn by the user.

FIG. 6C depicts a perspective view of the eyewear facemask 600 of FIG. 6A and eyewear 200 when worn by the user. As shown, the connector 604B can loop around the temple 202B of the eyewear 200. The grummet 606B is moved up towards the temple 202B to secure the connector 604B around the temple 202B. Moreover, the user tightened the connector 604B at the bottom portion of the facemask 600 such that the facemask 600 can cup the face of the user.

Figure 6D:
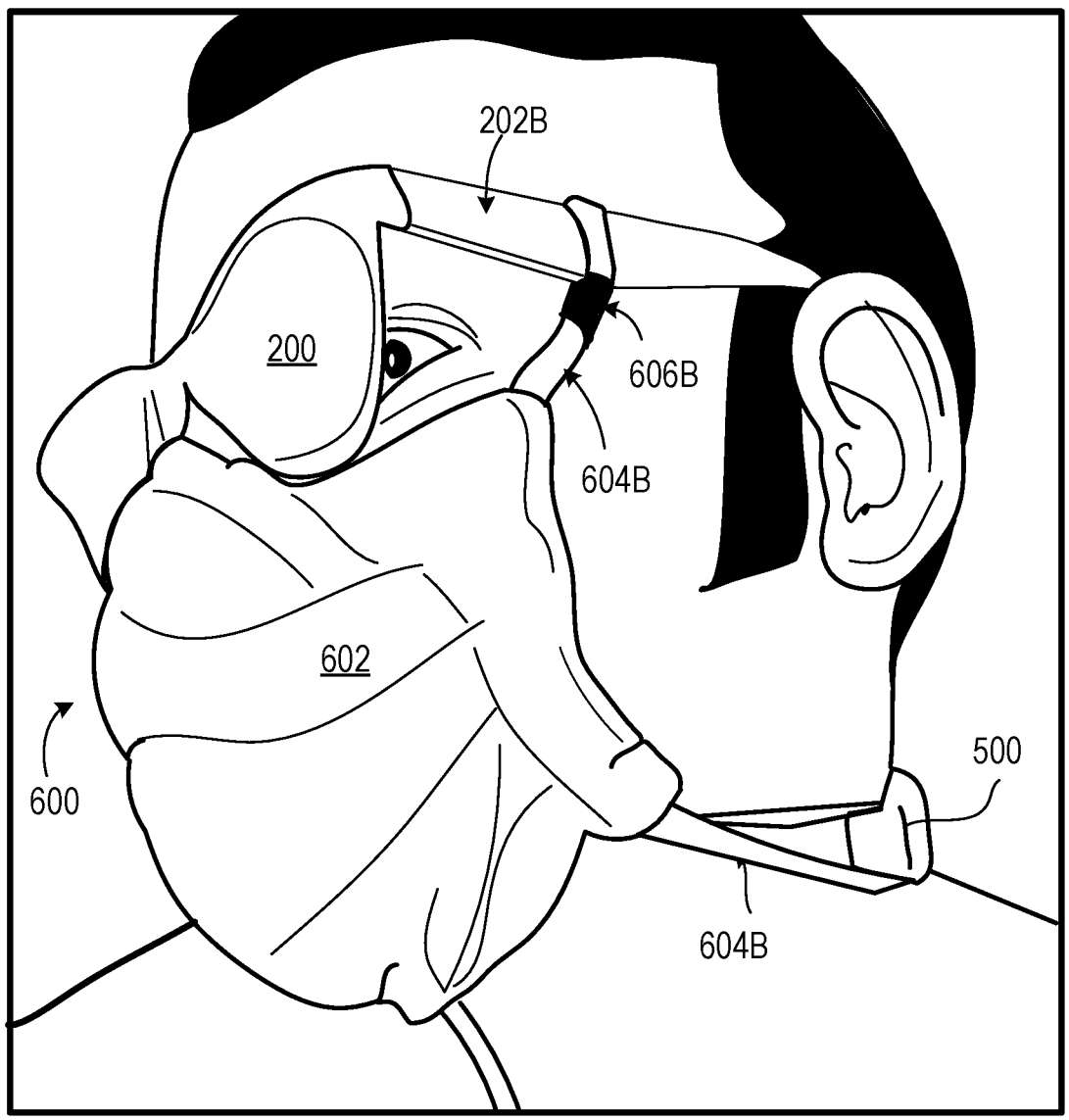
FIG. 6D depicts another perspective view of the eyewear facemask of FIG. 6A, eyewear, and the removable strap when worn by the user.

FIG. 6D depicts another perspective view of the eyewear facemask 600 of FIG. 6A, eyewear 200, and the removable strap 500 when worn by the user. As shown, the user can also pair the facemask 600 with the removable strap 500 described herein. The removable strap 500 can loop through the connector 604B that extends out from the bottom portion of the facemask 600. The user can then adjust the removable strap 500 to make it tighter or looser around a back of the user's head. In the example depicted in FIG. 6D, the removable strap 500 is worn lower at the back of the user's head, around the user's neck. in some implementations, this can improve comfort by distributing weight of the facemask 600 to both the temple 202B of the eyewear 200 and the back of the user's neck. In other implementations, the removable strap 500 can be worn higher up on the back of the user's head, based on user preference. When the facemask 600 is worn with the removable strap 500, the facemask 600 can fit relatively snuggly around the user's face. Moreover, in some implementations, as shown in reference to the facemask 100, the facemask 600 can be worn with only the removable strap 500 and without the eyewear 200.

Figure 6E:
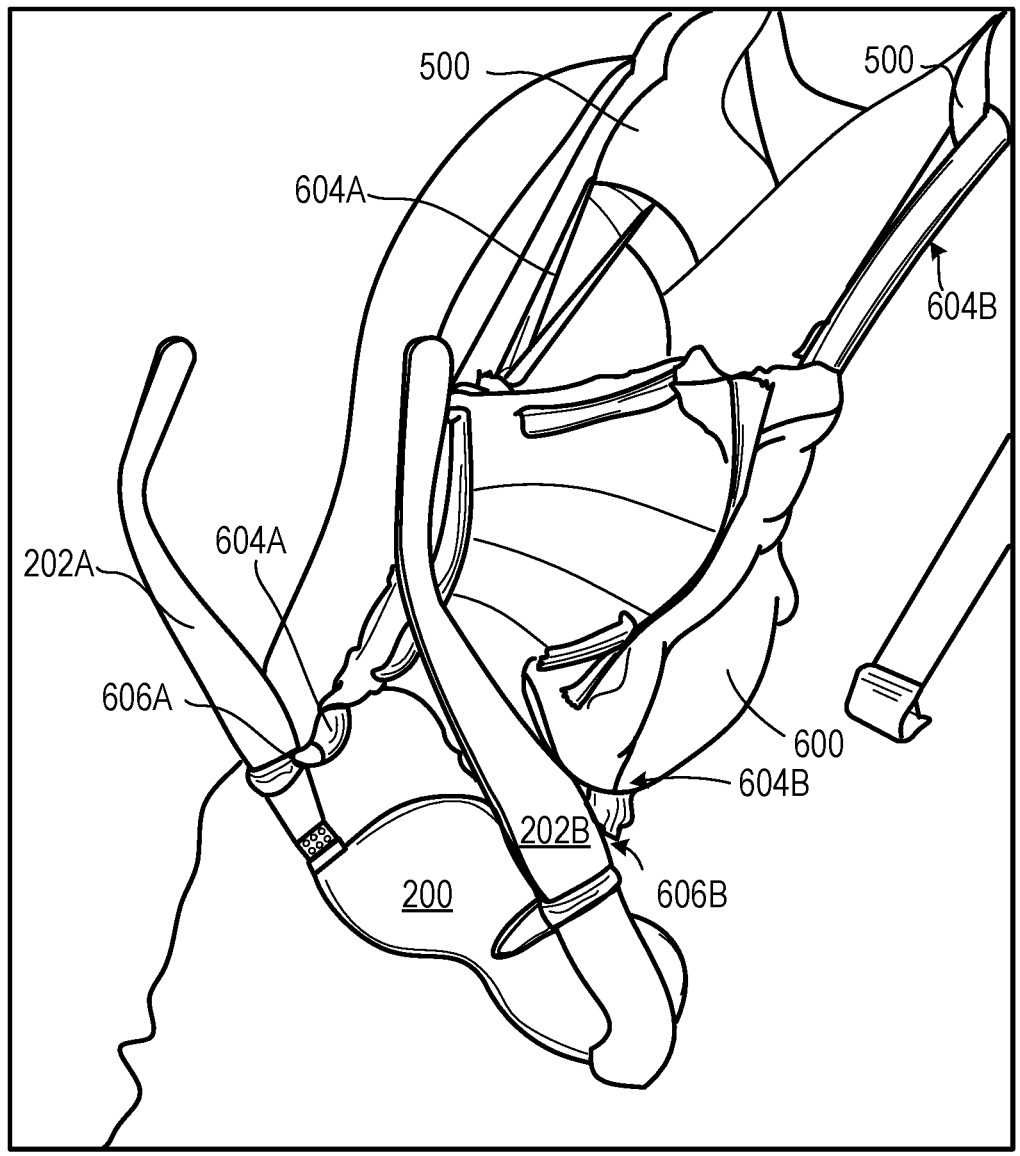
FIG. 6E depicts another perspective view of the eyewear facemask of FIG. 6A, the eyewear, and the removable strap when worn by the user around the user's neck.

FIG. 6E depicts another perspective view of the eyewear facemask 600 of FIG. 6A, the eyewear 200, and the removable strap 500 when worn by the user around the user's neck. The user may desire to take off both the eyewear 200 and the facemask 600. In some of such implementations, the removable strap 500 can be used to retain the eyewear 200 and the facemask 500 by letting the eyewear 200 and the facemask 600 hang over the user's chest with the removable strap 500 hanging around the user's neck. The grummets 606A-B can secure the connectors 604A-B to the temples 202A-B of the eyewear 200 such that the eyewear 200 and the facemask 600 can both hang over the user's chest without the eyewear 200 slipping out of the connectors 604A-B. This configuration can be advantageous for the user to keep the eyewear 200 and facemask 600 together and also to make it easier and faster to put both the eyewear 200 and the facemask 600 back on.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A face mask system configured for use with eyeglasses, the face mask system comprising:
    a face mask removably attached to the eyeglasses when worn by a user, the face mask comprising:
        a covering portion sized and shaped to cover at least part of a user's nose and/or mouth, the covering portion having first and second passages along first and second lateral edges of the covering portion;
        a first connector configured to be formed as a first continuous loop with a first pair of loop-sides both extending through the first passage and out of a top of the first passage, the first connector comprising an upper end that includes upper portions of the first pair of loop-sides, the upper end of the first connector configured to extend from the covering portion to a first temple of the eyeglasses; and
        a second connector configured to be formed as a second continuous loop with a second pair of loop-sides both extending through the second passage and out of a top of the second passage, comprising an upper end, the upper end of the second connector configured to extend from the covering portion to a second temple of the eyeglasses;
        a first fastener positioned on the first connector and configured to facilitate adjusting a size of the first continuous loop of the first connector; and
        a second fastener positioned on the second connector and configured to facilitate adjusting a size of the second continuous loop of the second connector;
        the first connector comprising a first lower end and a first lower loop proximate the first lower end, wherein the first pair of loop-sides both extend out of a bottom of the first passage and form the first lower loop; and
        the second connector comprising a second lower end and a second lower loop proximate the second lower end, wherein the second pair of loop-sides both extend out of a bottom of the second passage and form the second lower loop, wherein the first lower loop and the second lower loop are removably attached to each other by a strap configured to extend from the first lower loop to the second lower loop and behind a neck of the user.

* * * * *